(12) United States Patent  (10) Patent No.: US 7,579,296 B2
Naganuma et al.  (45) Date of Patent: Aug. 25, 2009

(54) BROAD BAND LIGHT ABSORBING PHOTOCATALYST, PROCESS FOR PRODUCING THEREOF, BROAD BAND LIGHT ABSORBING PHOTOCATALYST COMPOSITION, AND MOLDED ARTICLE

(75) Inventors: Yasuo Naganuma, Kawasaki (JP); Masato Wakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 28 days.

(21) Appl. No.: 11/168,459

(22) Filed: Jun. 29, 2005

(65) Prior Publication Data

US 2006/0199729 A1 Sep. 7, 2006

(30) Foreign Application Priority Data

Mar. 1, 2005 (JP) .............................. 2005-056583

(51) Int. Cl.
| | | |
|---|---|---|
| *B01J 27/047* | (2006.01) | |
| *B01J 27/132* | (2006.01) | |
| *C01B 15/16* | (2006.01) | |
| *C01B 25/26* | (2006.01) | |

(52) U.S. Cl. .................. 502/228; 502/219; 423/308
(58) Field of Classification Search ................ 502/228, 502/219; 423/308
See application file for complete search history.

(56) References Cited

U.S. PATENT DOCUMENTS

| 5,981,425 | A | * | 11/1999 | Taoda et al. ................. 502/208 |
|---|---|---|---|---|
| 6,077,492 | A | * | 6/2000 | Anpo et al. ............... 423/239.1 |
| 6,777,357 | B2 | * | 8/2004 | Aso et al. ....................... 501/1 |
| 7,157,503 | B2 | * | 1/2007 | Wakamura .................. 523/122 |
| 2005/0064075 | A1 | * | 3/2005 | Wakamura .................. 426/106 |
| 2005/0170220 | A1 | | 8/2005 | Aso et al. |
| 2007/0051668 | A1 | | 3/2007 | Watanabe et al. |
| 2008/0050440 | A1 | * | 2/2008 | Wakamura et al. .......... 424/489 |

FOREIGN PATENT DOCUMENTS

| EP | 1 516 533 | * | 3/2005 |
|---|---|---|---|
| JP | 07-267629 A | | 10/1995 |
| JP | 08-245208 | * | 9/1996 |
| JP | 11-034242 A | | 2/1999 |
| JP | 11-195345 | | 7/1999 |
| JP | 2000-327315 | | 11/2000 |
| JP | 2001-302220 | | 10/2001 |
| JP | 2002-143688 A | | 5/2002 |

(Continued)

OTHER PUBLICATIONS

Japanese Office Action dated Jan. 20, 2009 of JP 2005-056583.

*Primary Examiner*—Patricia L Hailey
(74) *Attorney, Agent, or Firm*—Westerman, Hattori, Daniels & Adrian, LLP.

(57) ABSTRACT

The present invention provides a broad band light absorbing photocatalyst which has a high absorptivity not only for visible light but also, in particular, for ultraviolet light, exhibits photocatalytic activity in response to a broad band light over a long period, has a high adsorptivity for objects to be decomposed, and can exhibit oxidative decomposition effect, antibacterial effect, antifouling effect, etc. The broad band light absorbing photocatalyst of the present invention includes an apatite having photocatalytic activity, a visible light absorbing metal atom and an ultraviolet light absorbing metal atom and the ultraviolet light absorbing metal atom is at least one of tungsten (W) and vanadium (V).

11 Claims, 7 Drawing Sheets

FOREIGN PATENT DOCUMENTS

| | | |
|---|---|---|
| JP | 2003-080078 | 3/2003 |
| JP | 2003-175338 | 6/2003 |
| JP | 2003-305371 | 10/2003 |
| JP | 2003-321313 | 11/2003 |
| JP | 2003-334883 | 11/2003 |
| JP | 2005-29671 | 2/2005 |
| WO | WO 2004/026470 A1 | 4/2004 |
| WO | WO 2005/110598 A1 | 11/2005 |

* cited by examiner

BROAD BAND LIGHT ABSORBING PHOTOCATALYST, PROCESS FOR PRODUCING THEREOF, BROAD BAND LIGHT ABSORBING PHOTOCATALYST COMPOSITION, AND MOLDED ARTICLE

CROSS-REFERENCE TO RELATED APPLICATIONS

This application is based upon and claims the benefits of the priority from the prior Japanese Patent Application No. 2005-056583, filed on Mar. 1, 2005, the entire contents of which are incorporated herein by reference.

BACKGROUND OF THE INVENTION

1. Field of the Invention

The present invention relates to a broad band light absorbing photocatalyst which has a high absorptivity not only for visible light but also, in particular, for ultraviolet light and exhibits photocatalytic activity in response to a broad band light; a process for producing thereof efficiently; a broad band light absorbing photocatalyst composition which comprises the broad band light absorbing photocatalyst; and a molded article which comprises the broad band light absorbing photocatalyst.

2. Description of the Related Art

In recent years, photocatalytic activity, which exhibits oxidative decomposition effect, antibacterial effect, antifouling effect, etc., of certain semiconductor materials, e.g. titanium oxide ($TiO_2$), has been paid attention to. In general, when the semiconductor materials having such photocatalytic activity absorbs light having an energy corresponding to the band gap between the valence band and the conductor band, the electron present in the valence band transits to the conductor band. The electron which transited to the conductor band have characteristics of moving to substances adsorbed on the surface of the semiconductor material having the photocatalytic activity and, when substances are adsorbed on the surface of the semiconductor material, the substances are reduced by the electron. Due to the transition, a hole is generated in the valence band. The hole generated in the valence band have characteristics of stripping the electron from the substance adsorbed on the surface of the semiconductor material having the photocatalytic activity and, when substances are adsorbed on the surface of the semiconductor material, the substances are oxidized as a result of the strip of the electron thereof by the hole.

To explain the above-mentioned phenomenon more specifically, taking titanium oxide having particularly excellent photocatalytic activity as an example, when titanium oxide absorbs light with energy equivalent to band gap between the valence band and conduction band, an electron in the valence band transits to the conduction band and the transited electron reduces oxygen in the air, thereby allowing generation of superoxide anion ($\cdot O_2$—). In contrast, as a result of the transition of the electron, a hole is generated in the valence band and the generated hole allows the generation of hydroxy radical ($\cdot OH$) by oxygenating water adsorbed on the surface of the titanium oxide. The resulting hydroxy radical is strongly oxidative, and thus when organic substances or the like are adsorbed on the surface of the titanium oxide, the organic substances or the like are decomposed by the action of the hydroxy radical and finally decomposed to water and carbon dioxide. In this way, when the semiconductor materials having photocatalytic activity, such as titanium oxide, are exposed to light with energy equivalent to band gap between the valence band and conduction band, the semiconductor materials absorbs the light and organic substances or the like are decomposed. Thus, oxidative decomposition effect, antibacterial effect, antifouling effect, etc. are achieved.

Therefore, recently, the semiconductor materials having photocatalytic activity, particularly, titanium oxide, have been widely utilized as anti-fungus agent, bactericide, antifouling agent, deodorant, agent for environmental cleanup, or the like. For example, Japanese Patent Application Laid-Open (JP-A) No. 11-195345 have disclosed a technique to provide a push button of electronics device with antibacterial properties by applying photocatalytic titanium oxide to the push button. Further, JP-A 2003-305371 have disclosed a photocatalytic thin film containing particles having photocatalysis composed of metal elements which have an electronegativity of less than 1.6, ionic radius of less than 0.2 nm and atomic valence of 2 or less and an article provided with the photocatalytic thin film on the surface thereof.

These proposals, however, have the following problems. Specifically, light energy required to excite titanium oxide exhibiting excellent photocatalytic activity is 3.2 eV, which corresponds to about 380 nm in terms of the wavelength of light. This means that when the titanium oxide is exposed to near ultraviolet light, it is excited, but when exposed to visible light, it is not excited. Ultraviolet light constitutes a small fraction, i.e., only 4 to 5% of sunlight, causing one problem that when sunlight is used as an exposure light, the titanium oxide does not exhibit satisfactory photocatalytic activity. Further, another problem is that when exposed to fluorescent light, in which ultraviolet light is hardly present, in a room, the titanium oxide hardly exhibits photocatalytic activity.

It has been strongly demanded to develop titanium oxide which solves such problem that articles for use under sunlight or fluorescent light in a room cannot be provided with adequate photocatalytic activity and, at the same time, exhibits satisfactory photocatalytic activity when exposed to visible light which accounts for 45% of sunlight and accounts for most of the fluorescent light. Thus, investigations related to the response of the titanium oxide to visible light have been widely made. Therefore, investigations about the response of the titanium oxide to visible light have been widely conducted.

As an example of such investigations, several techniques in order to provide the titanium oxide with visible light response have been provided, for example, a technique in which oxygen deficiency is formed and a technique in which the titanium oxide is doped with nitrogen. In these cases, however, satisfactory outcome for practical purposes has not been achieved and the current status of research is still on the research stage.

On the other hand, the titanium oxide has low absorption ability towards materials. Thus it is required to improve absorption ability of the titanium oxide towards objects to be decomposed in order to make the titanium oxide to exhibit oxidative decomposition effect, antibacterial effect, antifouling effect, etc. based on its photocatalytic activity.

Therefore, a technique utilizing the properties of an apatite, as a material having excellence in such absorption ability towards objects to be decomposed, has been researched and developed. The apatite such as calcium hydroxyapatite $Ca_{10}(PO_4)_6(OH)_2$ which is a main component of the hard tissue of a living body such as teeth and bones, is likely to undergo the ion exchange with a variety of cations and anions, has high biocompatibility and adsorption property, and has specific adsorption ability towards organic substances such as proteins.

As an example of such researches and developments, JP-A Nos. 2003-80078 and 2003-321313 have disclosed products in which semiconductor materials such as titanium oxide is utilized in combination with calcium phosphate compounds such as calcium hydroxyapatite and the products can exploit properties of both efficiently. Further, JP-A Nos. 2000-327315, 2001-302220, 2003-175338, and 2003-334883 have disclosed titanium-calcium hydroxyapatite $Ca_9Ti(PO_4)_6(OH)_2$ having photocatalytic function where calcium ions in the apatite is partially ion exchanged, so-called photocatalytic titanium hydroxyapatite (Ti-HAP).

In the case of the photocatalytic titanium hydroxyapatite (Ti-HAP), however, there is also a similar problem as mentioned above that when fluorescent light in a room in which ultraviolet light is hardly present, the titanium oxide hardly exhibits photocatalytic activity.

Accordingly, a broad band light absorbing photocatalyst which has a high absorptivity not only for visible light but also, in particular, for ultraviolet light, exhibits photocatalytic activity in response to a broad band light over a long period, has a high adsorptivity for objects to be decomposed, can exhibit oxidative decomposition effect, antibacterial effect, antifouling effect, etc. and is high-performance; a process for producing thereof efficiently; and a variety of techniques to which the broad band light absorbing photocatalyst is applied, have not been provided yet and thus development thereof has been demanded.

An object of the present invention is to solve the above-mentioned conventional problems and to provide a broad band light absorbing photocatalyst which has a high absorptivity not only for visible light but also, in particular, for ultraviolet light, exhibits photocatalytic activity in response to a broad band light over a long period, has a high adsorptivity for objects to be decomposed, can exhibit oxidative decomposition effect, antibacterial effect, antifouling effect, etc. and is high-performance; a process for producing thereof efficiently; a broad band light absorbing photocatalyst composition which comprises the broad band light absorbing photocatalyst; and a molded article which comprises the broad band light absorbing photocatalyst.

SUMMARY OF THE INVENTION

The broad band light absorbing photocatalyst of the present invention includes an apatite having photocatalytic activity, a visible light absorbing metal atom and an ultraviolet light absorbing metal atom and the ultraviolet light absorbing metal atom is at least one of tungsten (W) and vanadium (V).

Objects to be decomposed are efficiently adsorbed by the apatite having photocatalytic activity of the broad band light absorbing photocatalyst because the apatite having photocatalytic activity has excellent adsorption ability towards the objects to be decomposed. Then, since the apatite having photocatalytic activity itself has photocatalytic activity, upon exposure to predetermined light, the apatite having photocatalytic activity exhibits photocatalytic activity, i.e., the electron of the object to be decomposed which is adsorbed onto the surface of the apatite having photocatalytic activity is stripped, and the object to be decomposed is oxidized and decomposed. At this time, since the broad band light absorbing photocatalyst includes the ultraviolet light absorbing metal atom and the visible light absorbing metal atom, when ultraviolet light is irradiated to the broad band light absorbing photocatalyst, the ultraviolet light absorbing metal atom absorbs light energy of the ultraviolet light and, when visible light is irradiated to the broad band light absorbing photocatalyst, the visible light absorbing metal atom absorbs light energy of the visible light. As the result of the absorption of light energy of the ultraviolet light and visible light, the broad band light absorbing photocatalyst can utilize the light energy of the broad band light, in other words, it is broad band light absorptive. Thus, the broad band light absorbing photocatalyst has excellent photocatalytic activity and can exhibit decomposition effect towards the objects to be decomposed, antibacterial effect, antifouling effect, etc. In addition, even when exposed to ultraviolet light and visible light, the photocatalytic activity of the broad band light absorbing photocatalyst does not saturate and can exhibit excellent photocatalytic activity under fluorescent light in a room as well as under sunlight irradiation.

In the broad band light absorbing photocatalyst, the apatite having photocatalytic activity preferably includes a metal atom, at least a part of which is substituted with an ultraviolet light absorbing metal atom and a visible light absorbing metal atom, the content of the ultraviolet light absorbing metal atom relative to a total amount of metal atoms is preferably 0.001% by mol to 0.1% by mol, the visible light absorbing metal atom is preferably at least one selected from chromium (Cr) and nickel (Ni), the ratio of the photocatalytic activity at the time after irradiation with ultraviolet light (UV light) for 5 hours in a row A5 to the photocatalytic activity at the time after irradiation with ultraviolet light (UV light) for 2 hours in a row A2, i.e., A5/A2, determined under the same condition is preferably 1.3 or more.

A process for producing a broad band light absorbing photocatalyst of the present invention includes a step of doping an apatite having photocatalytic activity with a visible light absorbing metal atom and an ultraviolet light absorbing metal atom.

In the process for producing a broad band light absorbing photocatalyst, in the step of doping, the apatite having photocatalytic activity is doped with the visible light absorbing metal atom and the ultraviolet light absorbing metal atom. As a result, a broad band light absorbing photocatalyst is efficiently produced. Since the broad band light absorbing photocatalyst includes the visible light absorbing metal atom and the ultraviolet light absorbing metal atom, and also includes the apatite having photocatalytic activity, it adsorbs objects to be decomposed. At the same time, the broad band light absorbing photocatalyst, upon exposure to light, adsorbs a wide range of light and decomposes the object to be decomposed which is adsorbed on the surface thereof by the action of photocatalysis.

In the process for producing a broad band light absorbing photocatalyst, doping the apatite having photocatalytic activity with the visible light absorbing metal atom and the ultraviolet light absorbing metal atom is preferably carried out by dipping the apatite in an aqueous solution in which compound containing the ultraviolet light absorbing metal atom and compound containing the visible light absorbing metal atom are dissolved.

The broad band light absorbing photocatalyst composition of the present invention includes the broad band light absorbing photocatalyst. The broad band light absorbing photocatalyst composition preferably includes a resin. The broad band light absorbing photocatalyst composition can be applied in a wide variety of fields, for example, used in office automation (OA) equipments, electronic equipments, handheld terminals, filters, wallpapers, food containers, medical equipments, artificial teeth, interior and exterior materials, vehicles, stationary rings, handles, saddles, shoes, and bags.

The molded article of the present invention includes at least one of the broad band light absorbing photocatalyst of the present invention and the broad band light absorbing photocatalyst composition of the present invention.

BRIEF DESCRIPTION OF THE DRAWINGS

FIGS. 9A, 9B, and 9C are a front view, a side view, and a back view, respectively.

Figure 1:
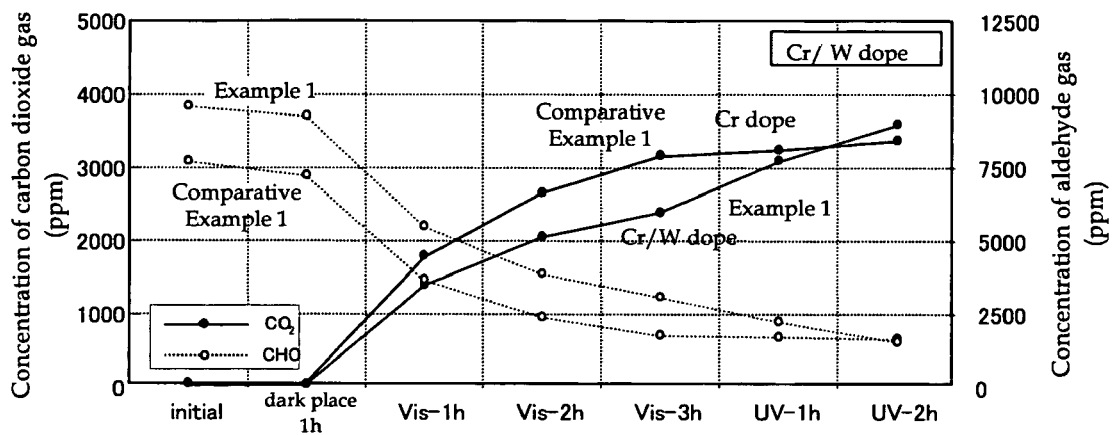
FIG. 1 is a graph showing the results of the photocatalytic activity evaluation of the Example 1 and Comparative Example 1 where the vessel was exposed to visible light and then to ultraviolet light.

DESCRIPTION OF THE PREFERRED EMBODIMENTS (Broad Band Light Absorbing Photocatalyst)

The broad band light absorbing photocatalyst comprises at least an apatite having photocatalytic activity, a visible light absorbing metal atom and ultraviolet light absorbing metal atom and may further comprise any other components selected according to necessity.

—Apatite Having Photocatalytic Activity—

The apatite having photocatalytic activity can be appropriately selected according to the purpose without limitation, as long as it has photocatalytic activity. Suitable example thereof include apatites containing a metal atom required for the apatites to possess photocatalytic activity. When the apatite contains the metal atom having photocatalytic activity, the apatite, upon exposed to light, can exhibit photocatalytic activity by the action of the metal atom having photocatalytic activity, deprive the objects to be decomposed which is adsorbed on the surface thereof of an electron, oxidize the objects to be decomposed and thus decompose the objects.

—Apatite—

The apatite can be appropriately selected from known or conventional apatites without limitation. Suitable examples thereof include ones represented by the following General Formula (1) and the like.

  General Formula (1)

$$A_m(BO_n)_z X_s$$

In the General Formula (1), "A" represents a metal atom and the metal atom is not particularly limited and can be appropriately selected in accordance with the object. Examples thereof are calcium (Ca), aluminium (Al), lanthanum (La), magnesium (Mg), strontium (Sr), barium (Ba), plumbum (Pb), cadmium (Cd), europium (Eu), yttrium (Y), cerium (Ce), sodium (Na), kalium (K), and the like. Among these, calcium (Ca) is particularly preferred in terms of adsorption.

"B" represents one of a phosphorus atom (P) and a sulfur atom (S). Among these, the phosphorus atom (P) is preferred from the point of biocompatibility.

"O" represents an oxygen atom.

"X" represents one of a hydroxyl group (OH), $CO_3$, a halogen atom. Among these, the hydroxyl group (OH) is particularly preferred from the point that it can form metal-oxide photocatalytic substructure together with the metal atom A. Examples of the halogen atom are a fluorine atom, a chlorine atom, a bromine atom, an iodine atom, and the like.

"m", "n", "z", and "s" represents an integer, for example, from the point of charge balance, "m" is preferably from 8 to 10, "n" is preferably from 3 to 4, "z" is preferably from 5 to 7, and "s" is preferably from 1 to 4.

Examples of the apatites represented by the General Formula (1) are hydroxyapatite, fluoroapatite or chloroapatite, or metal salt thereof, tricalcium phosphate or calcium hydrogen phosphate. Among these, hydroxyapatite, which corresponds to the apatite in case where X in the above General Formula (1) is a hydroxyl group (OH), is preferable, and calcium hydroxyapatite (CaHAP), which corresponds to the apatite in case where, in the above General Formula (1), A is calcium (Ca), B is a phosphorus atom (P), and X is a hydroxyl group (OH), i.e. $Ca_{10}(PO_4)_6(OH)_2$, is particularly preferred.

The calcium hydroxyapatite (CaHAP) is preferred in that it has excellent adsorption properties towards a variety of objects to be decomposed, especially, towards organic substances such as proteins because the CaHAP is liable to undergo the ion exchange with cation as well as with anion, and besides, it has excellent adsorption properties towards microorganisms such as viruses, fungi and bacteria, enabling propagation thereof to be inhibited or reduced.

The object to be decomposed can be appropriately selected according to the purpose without limitation. The component of the object may be, for example, protein, amino acid, lipid, carbohydrate or the like. The object to be decomposed may contain these singly, or may contain two or more of those. Generally, specific examples of the object to be decomposed include dirt derived from human skin, dirt, dust, sludge, unwanted component, liquid waste component, harmful substances in the soil or air, microorganisms, viruses. Examples of the harmful substance are acetaldehyde gas and the like. The microorganism is not particularly limited, may be a prokaryote or eukaryote and also include a protozoan. Examples of the prokaryote include Escherichia coli and Staphylococcus aureus, and Examples of the eukaryote include yeast, mould fungi such as fungus and actinomyces. Examples of the virus include DNA virus, RNA virus, and the like, and specific examples include an influenza virus and the like.

These objects to be decomposed may be in any form of a solid form, liquid form and gas form. When it is in a liquid form, examples of the object to be decomposed include liquid waste, liquid nutrients, circulation liquid, and the like. And when it is in a gas form, examples of the object to be decomposed include air, exhaust gas, circulating gas, and the like.

The content of the apatite in the broad band light absorbing photocatalyst can be appropriately set according to the purpose without limitation and is, for example, preferably 85% by mol to 97% by mol, and more preferably 85% by mol to 90% by mol. When the content of the apatite is less than 85% by mol, photocatalytic activity of the broad band light absorbing photocatalyst may not be adequate, and even if it exceeds 97% by mol, further effect cannot be obtained and it may invite decrease of adsorption properties towards objects to be decomposed, light absorbing property, or the like of the broad band light absorbing photocatalyst. The content of the apatite in the broad band light absorbing photocatalyst can be determined, for example, by quantitative analysis with ICP-AES.

—Metal Atom Having Photocatalytic Activity

The metal atom required for the apatites to possess photocatalytic activity is not particularly limited as long as it functions as a photocatalytic center and can be appropriately selected from known metal atoms having photocatalytic activity according to the purpose. Suitable examples thereof include at least one suitably selected from titanium (Ti), zinc (Zn), Manganese (Mn), tin (Sn), indium (In), Iron (Fe), and the like in terms of excellent photocatalytic activity. Among these, titanium (Ti) is preferred for it's particularly excellent photocatalytic activity.

The content of the metal atom required for the apatites to possess photocatalytic activity in the broad band light absorbing photocatalyst can be appropriately set according to the purpose without limitation and is, for example, preferably 5% by mol to 15% by mol, and more preferably 8% by mol to 12% by mol, each relative to the total amount of metal atoms in the broad band light absorbing photocatalyst.

When the content of the metal atom having photocatalytic activity is less than 5% by mol, photocatalytic activity of the broad band light absorbing photocatalyst may not be adequate, and even if it exceeds 15% by mol, further effect cannot be obtained and it may invite deterioration of adsorption properties towards objects to be decomposed, light absorbing property, or the like of the broad band light absorbing photocatalyst.

The content of the metal atom having photocatalytic activity in the broad band light absorbing photocatalyst can be determined, for example, by quantitative analysis with ICP-AES.

The metal atom having photocatalytic activity is incorporated (e.g., by substitution) into the crystal structure of the apatite as part of metal atoms constituting the crystal structure of the apatite, and thereby "photocatalytic substructure" which can exhibit photocatalytic function is formed in the crystal structure of the apatite.

The apatite having such photocatalytic substructure (metal oxide structure) has photocatalytic activity, apatite structure portion has excellent adsorption properties, and the apatite has superior adsorption properties towards objects to be decomposed than known metal oxides having photocatalytic activity. Thus, the apatite having such photocatalytic substructure exhibits excellent decomposition effect, antibacterial effect, antifouling effect and inhibition or reduction of propagation of fungi, bacteria, etc.

The apatite having photocatalytic activity may be appropriately prepared synthetically or commercially available products. The method for synthesizing the apatite having photocatalytic activity can be appropriately selected according to the purpose without limitation. Suitable example is a known coprecipitation method, specifically, in case of the calcium hydroxyapatite, it can be synthesized, for example, as follows. Specifically, initially, calcium nitrate containing calcium atom (Ca) as a raw material of the apatite is dissolved in a decarbonated pure water, with stirring using a magnetic stirrer, etc., phosphoric acid aqueous solution containing a phosphorus atom also as a raw material of the apatite is dropped. Next, ammonia water, etc., is added to adjust pH to 9, then, solution is subjected to aging at 100° C. for 5 hours, filtered, washed with pure water, dried, and subjected to other treatments to synthesize the calcium hydroxyapatite.

Suitable examples of commercial products of the apatite having photocatalytic activity are, in the case of the titanium-calcium hydroxyapatite, "PCAP-100" (name of commodity, available from Taihei Chemical Industrial Co., Ltd.), and the like.

—Ultraviolet Light Absorbing Metal Atom—

The ultraviolet light absorbing metal atom is at least one of tungsten (W) and vanadium (V), and these may be contained in the broad band light absorbing photocatalyst singly or in combination. The content of the ultraviolet light absorbing metal atom is preferably 0.001% by mol to 0.1% by mol relative to the total amount of metal atoms.

When the content of the ultraviolet light absorbing metal atom is less than 0.001% by mol, ultraviolet light absorption ability of the broad band light absorbing photocatalyst may not be adequate, and even if it exceeds 0.1% by mol, further effect cannot be obtained and it may invite decrease of adsorption properties towards objects to be decomposed or visible light absorption ability of the broad band light absorbing photocatalyst.

The content of the ultraviolet light absorbing metal atom in the broad band light absorbing photocatalyst can be determined, for example, by quantitative analysis with ICP-AES.

—Visible Light Absorbing Metal Atom—

The visible light absorbing metal atom can be appropriately selected according to the purpose without limitation. Suitable examples are ones which absorb light with wavelengths of greater than 400 nm, and the like. Specifically, at least one selected from chromium (Cr) and Nickel (Ni) is more preferred and chromium (Cr) is particularly preferred for its excellent visible light absorbing property.

The content of the visible light absorbing metal atom in the broad band light absorbing photocatalyst can be appropriately set according to the purpose without limitation and is, for example, preferably 0.001% by mol to 1% by mol, and more preferably 0.01% by mol to 1% by mol.

When the content of the visible light absorbing metal atom is less than 0.001% by mol, visible light absorption ability of the broad band light absorbing photocatalyst may not be adequate, and even if it exceeds 1% by mol, further effect cannot be obtained and it may invite decrease of adsorption properties towards objects to be decomposed or ultraviolet light absorption ability of the broad band light absorbing photocatalyst.

The content of the visible light absorbing metal atom in the broad band light absorbing photocatalyst can be determined, for example, by quantitative analysis with ICP-AES.

In the broad band light absorbing photocatalyst of the present invention, the total content of the metal atom required for possession of photocatalytic activity, ultraviolet light absorbing metal atom and visible light absorbing metal atom can be appropriately selected according to the purpose without limitation and is, for example, preferably 15% by mol or less and more preferably from 3% by mol to 15% by mol.

Even if the total content exceeds 15% by mol, improvement effect of photocatalytic activity corresponding to further addition cannot be obtained and rather, which may invite the decrease of photocatalytic activity.

Preferable specific example of the broad band light absorbing photocatalyst of the present invention is one in which the metal atom required for possession of photocatalytic activity is titanium (Ti), the apatite is calcium hydroxyapatite (Ca-HAP) is $Ca_{10}(PO_4)_6(OH)_2$, the ultraviolet light absorbing metal atom is at least one of tungsten (W) and vanadium (V), and the visible light absorbing metal atom is chromium (Cr).

Such broad band light absorbing photocatalyst can absorb not only visible light but also ultraviolet light, is broad band—light absorptive, can utilize light efficiently, and can be advantageously used for applications under radiation conditions of a variety of lights. Photocatalytic activity of the broad band light absorbing photocatalyst does not saturate in any case of visible light irradiation and ultraviolet light irradiation and exhibits excellent photocatalytic activity over a long period and, particularly, the broad band light absorbing photocatalyst is advantageous in that even when it has been exposed to ultraviolet light over a long period, excellent photocatalytic activity can be kept without saturation thereof.

—Shape and the Like—

The form, structure, size and other configurations of the broad band light absorbing photocatalyst can be appropriately selected according to the purpose without limitation.

Examples of the form are powder form, granular form, tablet form, rod form, plate form, block form, sheet form, film form, and the like, and among these, powder is preferred in terms of handleability or the like. The examples of the structure include single layer structure, multi-layer structure, porous structure, core shell structure, and the like.

Observation for identification, of the form, etc. of the broad band light absorbing photocatalyst can be carried out, for example, by TEM, XRD, XPS and FT-IR.

—Properties—

As for the properties of the broad band light absorbing photocatalyst of the present invention, the ratio of the photocatalytic activity at the time after irradiation with ultraviolet light (UV light) for 5 hours in a row A5 to the photocatalytic activity at the time after irradiation with ultraviolet light (UV light) for 2 hours in a row A2, i.e., A5/A2, determined under the same condition is preferably 1.3 or more, and more preferably 2.2 or more.

If the ratio A5/A2 is less than 1.3, photocatalytic activity saturates after ultraviolet light irradiation for a long period, thus photocatalytic activity against the objects to be decomposed under exposure to ultraviolet light may not be adequate and effect of improved decomposition ability may not be achieved adequately.

The photocatalytic activity can be evaluated by measuring the concentrations of objects to be decomposed, decomposition product, etc. For example, in a case where the object to be decomposed is acetaldehyde gas, the broad band light absorbing photocatalyst to be evaluated is irradiated with at least one of visible light and ultraviolet light under specific conditions, the concentration (ppm) of the acetaldehyde and the concentration (ppm) of carbon dioxide gas which is a decomposition product thereof is analyzed and monitored to evaluate the photocatalytic activity of the broad band light absorbing photocatalyst.

When the objects to be decomposed or the decomposition product is gas, for example, acetaldehyde gas, the concentration thereof can be measured by, for example, a gas chromatography.

As for the photocatalytic activity of the broad band light absorbing photocatalyst, the ratio of the reduced concentration (ppm) of the acetaldehyde gas at the time after irradiation with ultraviolet light for 5 hours in a row C5 to the reduced concentration (ppm) of the acetaldehyde gas after irradiation with ultraviolet light for 2 hours in a row C2, i.e., C5/C2, determined under the following condition is preferably 1.3 or more, and more preferably 2.2 or more. Specifically, the broad band light absorbing photocatalyst is placed in a 500 ml of closed vessel in such amount that the surface area thereof is 85.5 $m^2$, inside of the vessel is substituted with a gas containing 30% by volume of oxygen and 70% by volume of nitrogen. Then, 12 ml of the gas containing 14,000 ppm of acetaldehyde gas is injected inside the vessel with a syringe and the vessel is left in a dark place until the acetaldehyde gas reaches adsorption equilibrium with the broad band light absorbing photocatalyst. After the equilibrium, the vessel is further left in a dark place for 1 hour and then continuously irradiated with ultraviolet light with wavelengths of equal to or less than 380 nm.

If the ratio C5/C2 is less than 1.3, the photocatalytic activity saturates after ultraviolet light irradiation for a long period, thus photocatalytic activity against the objects to be decomposed under exposure to ultraviolet light may not be adequate and effect of improved decomposition ability may not be achieved adequately.

Note that the concentration of the acetaldehyde gas or the carbon dioxide gas can be measured by, for example, the above-mentioned gas chromatography.

—Aspects of Use—

The broad band light absorbing photocatalyst of the present invention may be used singly or in combination with other substances or the like, and may be used in slurry form or the like by dispersing in a liquid. In a case where it is used in slurry form, the liquid is preferably water or alcohols and this slurry can be suitably used as a photocatalyst-containing slurry.

The broad band light absorbing photocatalyst of the present invention may be used singly, may be used as a mixed composition by grinding thereof and then mixing with other compositions or the like, or may be used in film form (surface coating) by, for example, attachment, application, and vapor deposition to a substrate, etc. In the cases of attachment, application, and vapor deposition to a substrate, etc., coating solution can be suitably used.

The method for grinding can be appropriately selected according to the purpose without limitation. Suitable examples thereof are a method with use of a ball mill, and the like.

The other compositions can be appropriately selected according to the purpose without limitation. Examples thereof are inks for printing, and the like.

The method for mixing can be appropriately selected according to the purpose without limitation. Examples thereof are methods with use of a kneading device, stirring device, etc., and the like.

The substrate is not particularly limited and the material, shape, structure, thickness, etc. can be appropriately selected from known or conventional ones. Examples of the material are a paper, synthetic paper, woven cloth, non-woven cloth, leather, wood, glass, metal, ceramics, synthetic resin and the like. Examples of the shape are a foil, film, sheet, plate, and the like.

The method for the attachment can be appropriately selected according to the purpose without limitation. Examples thereof are spraying method, and the like.

The method for the application can be appropriately selected according to the purpose without limitation. Examples thereof are a spray coating method, curtain coating method, spin coating method, gravure coating method, inkjet method, dip method, and the like.

Examples of the method for the vapor deposition are a CVD method, sputtering method, vacuum vapor deposition method, and the like.

The coating solution is not particularly limited as long as it comprises the broad band light absorbing photocatalyst of the present invention and can be appropriately selected according to the purpose. Suitable example of the coating solution is one which is prepared as follows, or the like. The alcohol solution which is obtained by adding the broad band light absorbing photocatalyst of the present invention into isopropyl alcohol (IPA), etc., is added to a room-temperature setting type inorganic coating agent (obtained by mixing a liquid material (name of commodity: S00) and a liquid material (name of commodity: UTE01) in the ratio of 10 to 1, both available from Nihon Yamamura Glass Co., Ltd.) as an inorganic coating solution material.

—Application and the Like—

The broad band light absorbing photocatalyst of the present invention absorb and can utilize a broad band light since it has excellent broad band light absorbing property, the broad band light absorbing photocatalyst has excellent photocatalytic activity against a variety of objects to be decomposed or excellent ability to decompose objects to be decomposed and thus can decompose the objects to be decomposed efficiently since it has excellent adsorption property towards the objects to be decomposed, and photocatalytic activity is not reduced (does not saturate) over a long period. In addition, mixture of the broad band light absorbing photocatalyst with resin, etc., does not cause alteration, discoloration, deterioration, etc., of the resin, etc. and the broad band light absorbing photocatalyst is not stripped off or detached. Thus, the broad band light absorbing photocatalyst can be advantageously used in a variety of fields, for example, in a variety of products for use under sunlight irradiation, a variety of products for use under ultraviolet light irradiation, etc. Specifically, the broad band light absorbing photocatalyst can be suitably used in office automation (OA) equipments (housing of personal computer, mouse, keyboard), electronic equipments (e.g., telephone equipment, copy machine, facsimile, a variety of printers, digital camera, video, CD equipment, DVD equipment, air conditioner, remote-control unit), electronic products (e.g., dish washer, dish dryer, cloth drier, washing machine, air cleaner, conditioning machine, fan, exhaust fan, cleaner, garbage disposer), handheld terminals (e.g., Personal Digital Assistant (PDA), mobile phone), filters (e.g., for gas: ones used in a air cleaner, air conditioner, etc.; for liquid: ones for waste water of tank forming, etc.; for solid: ones for soil improvement; filter for a camera), wallpapers, food containers (e.g., recycle type, disposal type), medical equipments and sanitary goods (e.g., mask part of oxygen inhalators, cotton gauze, mask, antibacterial glove), textile products such a cloth, artificial teeth, materials for interior and exterior (e.g., ones such as made of resin, made of paper, made of cloth, made of ceramic, and made of metal; ones for a bath, pool, building material, etc., ones for medical facilities, bio-laboratories, clean benches, etc. which are exposed to fluorescent light if those are used by people and which are exposed to ultraviolet light if those are not used by people), vehicles (e.g., interior material, review mirror for vehicles), stationary rings (e.g., ones in a train or bus), handles (e.g., bicycle, tricycle, motorcycle, car), saddles (e.g., bicycle, tricycle, motorcycle), shoes (e.g., ones such as made of cloth, made of resin, made of artificial leather, and made of synthetic resin), bags (e.g., ones such as made of cloth, made of resin, made of artificial leather, and made of synthetic resin), paints (e.g., paint film), treatment materials for sewage water/discharged water (for example, a mixture in which the broad band light absorbing photocatalyst is mixed in a porous silica), sheets (e.g., soil treatment sheet), electrodes of biochips (in combination with organic dyes), mirrors (e.g., mirrors for a bathroom, rest room, dentistry, road, etc.), lenses (e.g., glass lens, optical lens, lens for lighting, lens for semiconductors, lens for copy machines, review camera lens for vehicles), prisms, glasses (e.g., window glass of buildings or lookout towers; window glass of vehicles such as automobiles, railway cars, airplanes, ships, submarines, snow cars, snowmobiles, gondolas of ropeways, gondolas of amusement parks, and spaceships; windshield of vehicles such as automobiles, motorcycles, railway cars, airplanes, ships, submarines, snow cars, snowmobiles, gondolas of ropeways, gondolas of amusement parks, and spaceships; glass of display cases for frozen foods, glass of display cases for heat-retention foods such as steamed bread), goggles (e.g., goggle for protection, goggle for sports), shields (e.g., shield of protection masks, shield of masks for sports, helmet shield), covers (cover of measurement equipments and cover of review camera lenses for vehicles), lenses (e.g., focusing lens of laser dentistry therapy equipments, etc.), covers (e.g., cover of sensors for laser light detection such as a sensor for measuring the distance between two cars, cover of infrared ray sensors, film, sheet, seal, escutcheon), and the like.

Further, the broad band light absorbing photocatalyst of the present invention is suitably used in wall materials, apparatuses (e.g., clean bench), laboratory instruments (e.g., spatula), tools (e.g., beaker), equipments (e.g., chip for micropipettes, Eppendorf tube) or the like in laboratories related to pharmaceuticals, foods and drinking, biotechnology or the like which is under fluorescent light irradiation in the daytime and under fluorescent light irradiation in the nighttime for sterilization or disinfection. Use of the broad band light absorbing photocatalyst of the present invention in these applications is extremely useful in that high catalytic activity can be achieved for 24 hours continuously, and constantly, decomposition of objects to be decomposed or the like can be carried out. Moreover, the broad band light absorbing photocatalyst of the present invention can be suitably used for cleaning up the air in a clean room or in the local space of a clean room, specifically, for decomposing and/or removing organic gases responsible for a certain problem, i.e., adhesion of the organic gas to the surface of a silicon wafer leads to the surface of a silicon wafer being hydrophobic and a film, which is to be deposited, become less adherent to the surface. Specifically, the broad band light absorbing photocatalyst of the present invention can be suitably used in the wall materials, duct filters, tools, equipments, etc. of the clean room and use of the broad band light absorbing photocatalyst of the present invention in these applications is highly effective in that decomposition of objects to be decomposed or the like can be carried out efficiently.

Further, the broad band light absorbing photocatalyst can be suitably used for the broad band light absorbing photocatalyst composition of the present invention, the molded article of the present invention which are described below and the like.

The broad band light absorbing photocatalyst of the present invention can be produced according to appropriately selected method, but can be particularly suitably produced by the process for producing a broad band light absorbing photocatalyst of the present invention described below.

(Process for Producing a Broad Band Light Absorbing Photocatalyst)

The process for producing a broad band light absorbing photocatalyst of the present invention comprises a doping step, and further may comprise a sintering step and other steps suitably selected according to the necessity.

—Doping Step—

The doping step is a step for doping the above-mentioned apatite having photocatalytic activity with the above-mentioned visible light absorbing metal atom and the above-mentioned ultraviolet light absorbing metal atom.

In the doping step, the form of the doping can be appropriately selected according to the purpose without limitation. Examples thereof are substitution, chemical bond, adsorption, and the like. Among these, substitution is preferred from the viewpoint that reaction is easily controlled and the ultraviolet light absorbing metal atom or the visible light absorbing metal atom does not detach after doping, thus enabling stable retention of these in the broad band light absorbing photocatalyst.

The form of the substitution can be appropriately selected according to the purpose without limitation. In one suitable example, when the apatite containing a metal atom required for possession of photocatalytic activity is used as the apatite having photocatalytic activity, at least a part of the metal atom is substituted with the ultraviolet light absorbing metal atom and the visible light absorbing metal atom. In this case, the ultraviolet light absorbing metal atom and the visible light absorbing metal atom can be retained in the apatite without detachment.

The types of substitution with the ultraviolet light absorbing metal atom and the visible light absorbing metal atom can be appropriately selected according to the purpose without limitation. Examples thereof include ion exchange, and the like. Ion exchange is advantageous for its excellent substitution efficiency.

Specific method for doping, i.e., specific method for doping the above-mentioned apatite having photocatalytic activity with the ultraviolet light absorbing metal atom and the visible light absorbing metal atom can be appropriately selected according to the purpose without limitation. Suitable examples thereof are a dipping method, coprecipitation method, and the like. In the dipping method, the apatite containing a metal atom having the photocatalytic activity is dipped in an aqueous solution in which compound containing the ultraviolet light absorbing metal atom and compound containing the visible light absorbing metal atom are dissolved (coexisted). In the coprecipitation method, an aqueous solution in which raw material of the apatite containing a metal atom having the photocatalytic activity, compound containing the ultraviolet light absorbing metal atom and compound containing the visible light absorbing metal atom are dissolved (coexisted), is prepared, and in the solution, the raw material, the ultraviolet light absorbing metal atom and the visible light absorbing metal atom are coprecipitated.

The aqueous solution may be left at rest, but is preferably stirred for efficient substitution. The aqueous solution may be stirred using known apparatuses or means, for example, a magnetic stirrer or stirring device.

Among these methods, the dipping method is more preferred for its convenient operation.

In the dipping method, as mentioned above, the apatite containing a metal atom having photocatalytic activity may be dipped in the aqueous solution in which compound containing the ultraviolet light absorbing metal atom and compound containing the visible light absorbing metal atom are dissolved (coexisted). Conversely, compound containing the ultraviolet light absorbing metal atom and compound containing the visible light absorbing metal atom may be dissolved in an aqueous solution in which the apatite containing a metal atom having photocatalytic activity is dispersed.

Further, in the process for producing a broad band light absorbing photocatalyst of the present invention, the apatite having photocatalytic activity is used as a starting material. Alternatively, the above mentioned apatite and the above mentioned metal atom having photocatalytic activity may be used as a starting material and prior to doping with the ultraviolet light absorbing metal atom and the visible light absorbing metal atom, the apatite may be doped with the metal atom required for possession of photocatalytic activity. In this case, initially, the apatite having photocatalytic activity is formed and then doping with the ultraviolet light absorbing metal atom and the visible light absorbing metal atom is carried.

In the case where the apatite having photocatalytic activity is used as a starting material, titanium-calcium hydroxyapatite (TiHAP) in which Ti is doped beforehand can be suitably used as the apatite having photocatalytic activity.

The concentration of the apatite containing a metal atom having photocatalytic activity in the aqueous solution at the time of doping can be appropriately set according to the purpose without limitation and is, for example, preferably $1\times10^{-4}$ M to $1\times10^{-3}$ M.

When the concentration of the apatite containing a metal atom having photocatalytic activity is less than $1\times10^{-4}$ M, photocatalytic activity may decrease. Also, when it exceeds $1\times10^{-3}$ M, photocatalytic activity may decrease.

The concentration of the ultraviolet light absorbing metal atom in the aqueous solution at the time of doping can be appropriately set according to the purpose without limitation and is, for example, preferably $1\times10^{-3}$ M to $1\times10^{-2}$ M and more preferably $9\times10^{-3}$ M to $1\times10^{-2}$ M.

When the concentration of the ultraviolet light absorbing metal atom is less than $1\times10^{-3}$ M, photocatalytic activity under ultraviolet light may decrease. Also, when it exceeds $1\times10^{-2}$ M, photocatalytic activity under ultraviolet light may decrease.

The concentration of the visible light absorbing metal atom in the aqueous solution at the time of doping can be appropriately set according to the purpose without limitation and is, for example, preferably $1\times10^{-4}$ M to $1\times10^{-3}$ M and more preferably $1\times10^{-4}$ M to $5\times10^{-4}$ M.

When the concentration of the visible light absorbing metal atom is less than $1\times10^{-4}$ M, responsiveness to visible light may decrease. Also, when it exceeds $1\times10^{-3}$ M, responsiveness to visible light may decrease.

The apatite containing a metal atom required for possession of photocatalytic activity can be doped with the ultraviolet light absorbing metal atom and the visible light absorbing metal atom in any order without limitation and can be appropriately selected according to the purpose. For example, the apatite containing a metal atom required for possession of photocatalytic activity may be doped with the visible light absorbing metal atom prior to the ultraviolet light absorbing metal atom, conversely, may be doped with the ultraviolet light absorbing metal atom prior to the visible light absorbing metal atom, or may be doped with both of them at the same time, from the viewpoint of the improvement of the ultraviolet light absorbing property of the broad band light absorbing photocatalyst, it is preferable that the apatite containing a metal atom required for possession of photocatalytic activity is doped with the visible light absorbing metal atom prior to the ultraviolet light absorbing metal atom.

The form of the ultraviolet light absorbing metal atom to be dipped at the time of doping is preferably in salt form or hydrated form for allowing the ultraviolet light absorbing metal atom to be dissolved readily and allowing the concentration thereof in the aqueous solution to be controlled readily.

The salt or hydrate can be appropriately selected according to the purpose without limitation. For the ultraviolet light absorbing metal atom, suitable example of the salt or hydrate is, as a tungsten- or vanadium-containing salt or hydrate, at least one of phosphotungstic acid n-hydrate and vanadate. Examples of the vanadate include ammonium vanadate.

The form of the visible light absorbing metal atom to be dipped at the time of doping is preferably in salt form or hydrated form for allowing the visible light absorbing metal atom to be dissolved readily and allowing the concentration thereof in the aqueous solution to be controlled readily.

The salt or hydrate can be appropriately selected according to the purpose without limitation. For example, in the case where the visible light absorbing metal atom is chromium (Cr) and nickel (Ni), a salt containing at least one selected from these is preferred and nitrates and ammonium salts are preferred since chlorides and sulfates cause decrease of photocatalytic activity.

Reaction system in which the doping is carried out can be appropriately selected according to the purpose without limitation. For example, it is carried out in a liquid, in the air, or the like, but preferably in the liquid.

In this case, the liquid can be appropriately selected according to the purpose without limitation, but water or a liquid mainly containing water is preferred.

A container to hold the liquid is not particularly limited and can be appropriately selected from known ones. Examples thereof are, in case of large scale, a mixer, stirrer, and the like and in case of small scale, a beaker, and the like.

The conditions of doping are not particularly limited and temperature, time, pressure and other conditions can be appropriately selected according to the purpose.

The temperature is not particularly limited, is different depending on the types, ratio of amounts, etc. of materials and cannot be clearly defined unconditionally. For example, the temperature is normally about 0° C. to about 100° C. and is preferably a room temperature (20° C. to 30° C.). The time is not particularly limited, is different depending on the types, ratio of amounts, etc. of materials and cannot be clearly defined unconditionally, but it is normally about 10 seconds to about 30 minutes and is preferably 1 minute to 10 minutes. The pressure is not particularly limited, is different depending on the types, ratio of amounts, etc. of materials and cannot be clearly defined unconditionally, but normally, it is preferably atmosphere pressure.

The amounts of the metal atom having photocatalytic activity, ultraviolet light absorbing metal atom and the visible light absorbing metal atom can be desirably controlled by suitably adjusting addition amount (M) thereof or the conditions.

—Sintering Step—

The sintering step is a step in which the doped apatite is sintered at 600° C. to 800° C., which is carried out after the doping step where the apatite having photocatalytic activity is doped with the ultraviolet light absorbing metal atom and the visible light absorbing metal atom.

When the sintering temperature is less than 600° C., photocatalytic activity may not be maximized, and when it exceeds 800° C., decomposition may occur.

The conditions of the sintering step, e.g., time, atmosphere, pressure, apparatuses, etc. can be appropriately selected according to the purpose without limitation. The time is different according to the amount, etc. of the doped apatite and cannot be clearly defined unconditionally, but, for example, it is preferably 1 hour or more and more preferably 1 to 2 hours. Examples of the atmosphere are an inert gas atmosphere such as nitrogen and argon, an air atmosphere, and the like, but the air atmosphere is preferred. Examples of the pressure are atmosphere pressure, and the like. As the apparatus, a known sintering apparatus can be used.

By carrying out sintering in the sintering step, crystallinity of the apatite having photocatalytic activity which is doped with the ultraviolet light absorbing metal atom and the visible light absorbing metal atom, can be improved and photocatalytic function of the broad band light absorbing photocatalyst according to the present invention can be further improved.

—Other Steps—

The other steps can be appropriately selected according to the purpose without limitation. Examples thereof are an aging step, a washing step, a drying step, and the like.

The aging step is a step for allowing the crystal of the apatite having photocatalytic activity to grow or age. The aging step is preferably carried out prior to the sintering step, and the washing step and drying step which are described below.

The washing step is a step in which doped apatite is washed, which is carried out after the apatite containing a metal atom having photocatalytic activity is doped with the ultraviolet light absorbing metal atom and the visible light absorbing metal atom. When the washing step is carried out, the sintering step is preferably carried out after the washing step.

The drying step is a step for drying washed apatite (which contains a metal atom required for possession of photocatalytic activity and is doped with the ultraviolet light absorbing metal atom and the visible light absorbing metal atom).

The temperature of drying can be appropriately selected according to the purpose without limitation, but is preferably 90° C. to 120° C.

—Example of Production—

One example of the process for producing a broad band light absorbing photocatalyst of the present invention will be described. When the substitution is carried out by ion exchange using a dipping method, initially, chromium (III) nitrate 9-hydrate containing chromium as the visible light absorbing metal atom is dissolved in pure water to prepare an aqueous solution of chromium nitrate. Titanium-calcium hydroxyapatite (TiHAP) as the apatite containing a metal atom (titanium) having photocatalytic activity is weighed in a beaker and the aqueous solution of chromium nitrate is added therein. After stirring of this mixture for 5 minutes with a magnetic stirrer, the mixture is suction filtered through a filter paper using an aspirator, washed with pure water, and dried for two hours in an oven at 100° C. to obtain TiHAP powder doped with chromium as the visible light absorbing metal atom. Next, ammonium vanadate containing vanadium as the ultraviolet light absorbing metal atom is dissolved in pure water to prepare an aqueous solution of ammonium vanadate. The above-mentioned chromium-doped TiHAP is weighed in a beaker and the aqueous solution of ammonium vanadate is added therein (this is the "doping step"). After stirring of this mixture with a magnetic stirrer (this is the "aging step"), the mixture is suction filtered through a filter paper using an aspirator, washed with pure water (this is the "washing step"), and dried for two hours in an oven at 100° C. (this is the "drying step"). Thereafter, sintering (under an air atmosphere) is carried out at 650° C. for 1 hour in a muffle furnace (this is the "sintering step"). In this way, a broad band light absorbing photocatalyst comprising TiHAP powder (apatite containing a metal atom required for possession of photocatalytic activity) which is doped with chromium as the visible light absorbing metal atom and vanadium as the ultraviolet light absorbing metal atom, is produced.

(Broad Band Light Absorbing Photocatalyst Composition)

The broad band light absorbing photocatalyst composition of the present invention comprises the above-mentioned broad band light absorbing photocatalyst, and further may comprise a rein and other components suitably selected according to the necessity.

When the broad band light absorbing photocatalyst composition is a resin composition containing the resin, in light of mixing properties, etc. with the resin, the broad band light absorbing photocatalyst is preferably in powder form.

—Resin—

The resin can be appropriately selected according to the purpose without limitation. Suitable examples thereof are biodegradable resins, thermoplastic resins, and the like. These may be contained singly, or two or more may be contained in combination.

The biodegradable resin can be appropriately selected from known or conventional ones without limitation. Examples thereof are biodegradable resins derived from natural products, chemically synthesized biodegradable resins, and other resins. These may be used singly, or two or more may be used in combination.

Examples of the biodegradable resin derived from natural products are chitin, chitosan, alginic acid, gluten, collagen, polyamino acid, bacteria cellulose, pullulan, curdlan, polysaccharide by-product, starch, modified starch, microbiologically-produced polyester (biopolyester), and the like.

Examples of the chemically synthesized biodegradable resin are aliphatic polyesters, aliphatic-aromatic polyesters, polyvinyl alcohols (PVA), polyurethanes (PU), and the like. Examples of the aliphatic polyester are polyhydroxyalkanoate-based (e.g., poly(3-hydroxybutyrate) (PHB), polyhydroxyvalerate) aliphatic polyesters; polycaprolactam (PCL)-based aliphatic polyesters; polybutylene succinate (PBS)-based aliphatic polyesters; polybutylene succinate adipate (PBSA)-based aliphatic polyesters; poly ethylene succinate (PES)-based aliphatic polyesters; polyglycolic acid (PGA)-based aliphatic polyesters; polylactic acid (PLA)-based aliphatic polyesters; and the like. Examples of the other resins are aliphatic polyester-carbonate copolymers and, copolymers of aliphatic polyester and polyamide, and the like.

Of the biodegradable resins, aliphatic polyester resins are preferred for their excellent formability, heat resistance, impact resistance, etc. Among them, polylactic acid (PLA)-based aliphatic polyester resins are more preferred and polylactic acid is particularly preferred.

Examples of the polylactic acid (PLA)-based aliphatic polyester resin are polymers of oxyacids such as lactic acid, malic acid, and glycolic acid, and copolymers thereof, and the like. Among these, particularly suitable example is a hydroxycarboxylic acid-based aliphatic polyester resin typified by polylactic acid.

Production method of the hydroxycarboxylic acid-based aliphatic polyester resin can be appropriately selected according to the purpose without limitation. Examples thereof are a lactide method in which ring-opening polymerization is carried out between lactide of cyclic diester and corresponding lactones, lactic acid direct dehydration condensation method, and the like. Further, examples of a catalyst used during production are tin compounds, antimony compounds, zinc compounds, titanium compounds, iron compounds, aluminium compounds, and the like. These may be used singly, or two or more may be used in combination. Among these, tin compounds and aluminium compounds are preferable, and tin octylate and aluminum acetylacetonato are more preferable.

The thermoplastic resin can be appropriately selected from known or conventional ones without limitation. Examples thereof are polyolefins, polyesters, polycarbonates, polystyrenes, fluorocarbon resins, melamine resins, polyester resins, alkyd resins, amino resins, epoxy resins, urethane resins, acrylic resins, vinyl chloride resins, silicone resins, phenolic resins, xylene resins, toluene resins, styrene-butadiene resins, acrylonitrile-butadiene resins, methyl methacrylate-butadiene resins, modified methyl methacrylate-butadiene resins, ethylene-vinyl acetate resins, vinylidene chloride resins, and the like. These may be used singly, or two or more may be used in combination. Among these, polyolefin resins such as polyethylene resin and polypropylene resin are preferred in terms of formability, etc.

The content of the resin in the broad band light absorbing photocatalyst composition can be appropriately set according to the purpose without limitation and is, for example, preferably 80% by mass to 99% by mass, and more preferably 90% by mass to 95% by mass.

If the content of the resin is less than 80% by mass, strength of the composition may decrease and if it exceeds 99% by mass, the composition may not exhibit photocatalytic activity.

The content of the broad band light absorbing photocatalyst in the broad band light absorbing photocatalyst composition can be appropriately set according to the purpose without limitation and is, for example, preferably 0.1% by mass to 20% by mass, and more preferably 5% by mass to 10% by mass.

If the content of the broad band light absorbing photocatalyst is less than 0.1% by mass, the composition may not exhibit photocatalytic activity and if it exceeds 20% by mass, mechanical strength may decrease.

—Other Components—

The other components can be appropriately selected from known or conventional ones according to the purpose without limitation and includes, for example, a filler, a flame retardant and a plasticizer.

These can be used by an amount suitably selected within a range not adversely affecting the effect of the present invention. These may be used singly, or two or more may be used in combination.

The filler can be appropriately selected from known or conventional ones according to the purpose without limitation and includes, for example, aluminum hydroxide, aluminium, calcium carbonate, calcium silicate, carbon, kaolin, mica, molybudenum disulfide, talc, montmorillonite, graphite, carbon materials such as carbon black, metal oxides such as magnesium oxide, titanium oxide, silica oxide and silicon dioxide, and the like.

The flame retardant can be appropriately selected from known or conventional ones according to the purpose without limitation and includes, for example, silicone compounds, metal salts, metal hydroxides, phosphorus compounds, and the like. Among these, an inorganic flame retardant is preferred and the metal hydroxide is more preferred, at least one of magnesium hydroxide and aluminum hydroxide is particularly preferred. These may be used singly, or two or more may be used in combination.

In the broad band light absorbing photocatalyst composition of the present invention, direct addition of the broad band light absorbing photocatalyst into the resin does not cause deterioration, discoloration, etc. Further, the broad band light absorbing photocatalyst composition of the present invention is broad band light absorptive and exhibits excellent photocatalytic activity under both of visible light and ultraviolet light. Moreover, the broad band light absorbing photocatalyst composition of the present invention, especially resin composition, is advantageous for mass production of a variety of molded articles by various molding methods.

(Molded Article)

The molded article of the present invention is not particularly limited as long as it is formed of at least one of the above-mentioned broad band light absorbing photocatalyst and the above-mentioned broad band light absorbing photocatalyst composition of the present invention. Shape, structure, size, etc. thereof can be appropriately selected according to the purpose.

The molding method of the molded article can be appropriately selected from known or conventional ones according to the purpose without limitation and includes, for example, a film molding method, extrusion molding method, injection molding method, blow molding method, compression molding method, transfer molding method, calender molding method, heat molding method, flow molding method, laminate molding method, compression molding method using a mold, and the like.

Among these, when the molded article is obtained as electronic products, etc. such as a housing of a personal computer, a keyboard, a mouse, a handheld terminal and the like, any one selected from the film molding method, extrusion molding method, and injection molding method is preferred.

The molded article has the broad band light absorbing photocatalyst at least one of on the surface thereof and inside thereof.

Specific examples of the molded article include similar ones as the various products, etc. which are exemplified as applications of the above-mentioned broad band light absorbing photocatalyst of the present invention.

—Concrete Example—

One concrete example of the molded article of the present invention will be described hereinafter with reference to the drawings.

Figure 7:
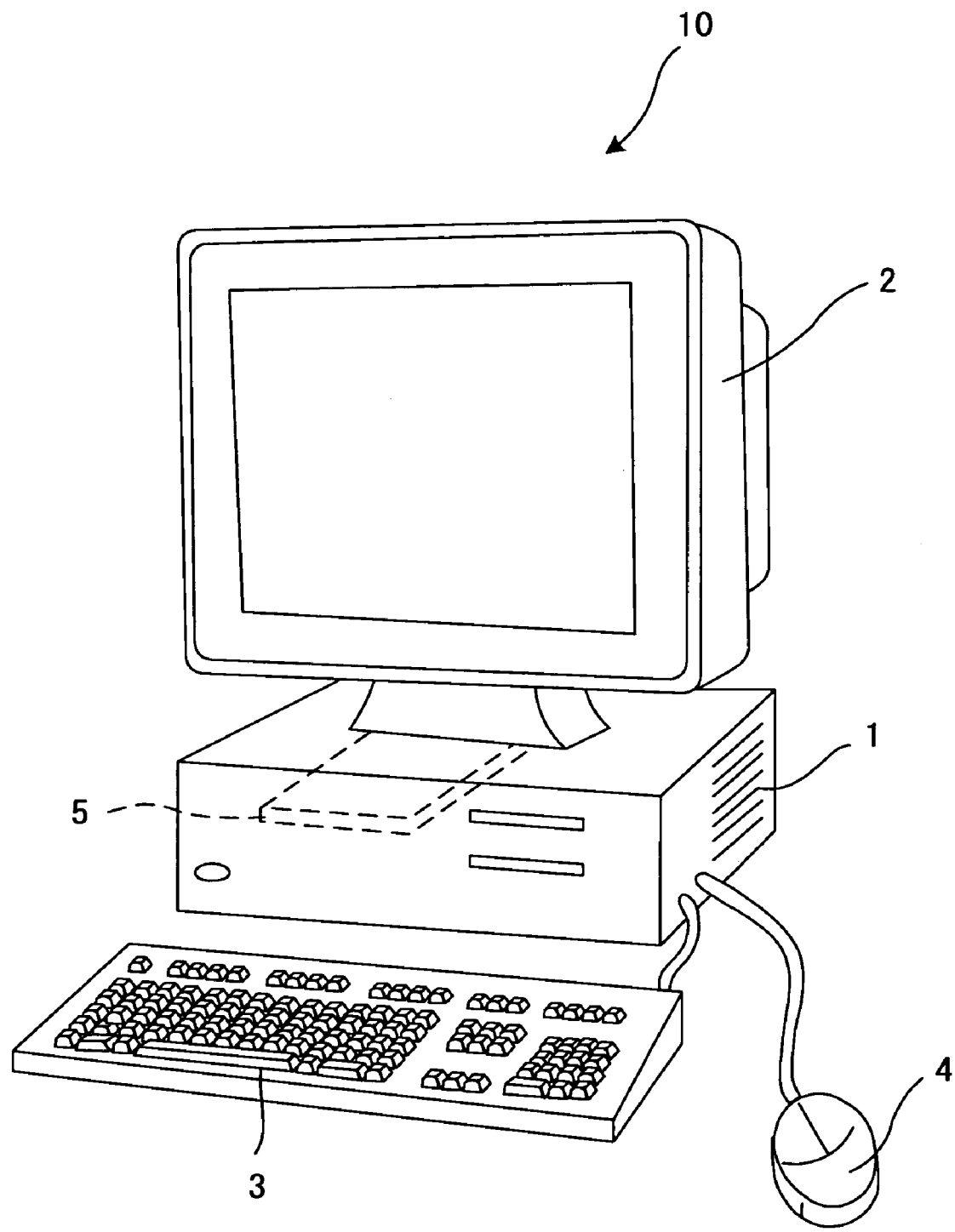
FIG. 7 is a schematic diagram illustrating a specific example of the cases where the molded article of the present invention is a desktop personal computer.

FIG. 7 is a schematic diagram illustrating an example of the cases where the molded article of the present invention is a desktop personal computer.

A desktop personal computer 10 has a personal computer main body 1, a display part 2, a keyboard 3 serving as input means, and a mouse 4. The personal computer main body 1 comprises a hard disk device 5, and a printed board with a CPU, a memory, etc. The display part 2 may be a CRT display or a liquid crystal display, and the display part 2 may be separated from or integrated with the personal computer main body 1.

The desktop personal computer 10, i.e., the display part 2, personal computer main body 1, keyboard 3 and mouse 4, has surfaces which are spray coated with the coating solution containing the broad band light absorbing photocatalyst of the present invention and the broad band light absorbing photocatalyst is exposed on the surfaces. Thus, desktop personal computer 10 absorbs both of visible light and ultraviolet light and can exhibit high photocatalytic activity. In addition, photocatalytic activity under any of visible light and ultraviolet light does not saturate and exhibits satisfactory antifouling properties against hand discharge, cigarette tar, etc. and also exhibits antibacterial properties against microorganisms such as fungus and bacteria, and the like.

The screen of the display part 2 can be provided with a filter having a surface on which the broad band light absorbing photocatalyst of the present invention is coated. Further, housings of the display part 2, personal computer main body 1, keyboard 3 and mouse 4, can be molded using the broad band light absorbing photocatalyst composition (resin composition) of the present invention.

Figure 8:
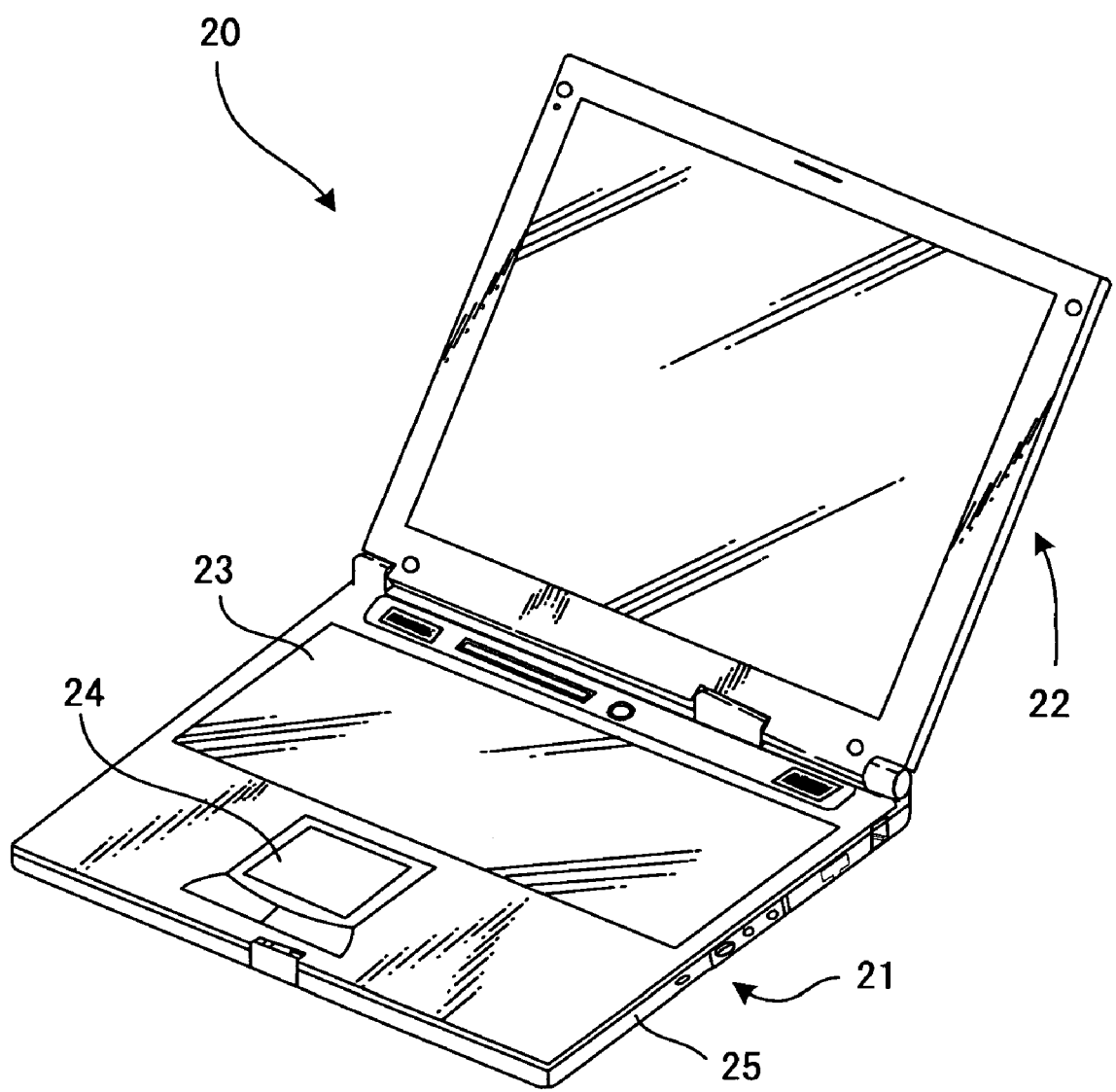
FIG. 8 is a schematic diagram illustrating a specific example of the cases where the molded article of the present invention is a laptop personal computer.

FIG. 8 is a schematic diagram illustrating an example of the cases where the molded article of the present invention is a laptop personal computer.

A laptop personal computer 20 has a laptop personal computer main body 21 and a liquid crystal display panel 22 which is rotated to be opened. The laptop personal computer main body 21 has a keyboard part 23 serving as input means and a pointing device 24 on the top face of a flatted housing 25, and the housing 25 houses a hard disk device, a printed board with a CPU, a memory, etc., and a battery.

The laptop personal computer 20 has surfaces which are spray coated with the coating solution containing the broad band light absorbing photocatalyst of the present invention and the broad band light absorbing photocatalyst is exposed on the surface. Thus, laptop personal computer 20 absorbs both of visible light and ultraviolet light and can exhibit high photocatalytic activity. In addition, photocatalytic activity under any of visible light and ultraviolet light does not saturate and exhibits satisfactory antifouling properties against hand discharge, cigarette tar, etc. and also exhibits antibacterial properties against microorganisms such as fungus and bacteria, and the like.

The screen of the liquid crystal display panel 22 can be provided with a filter having a surface on which the broad band light absorbing photocatalyst of the present invention is coated. Further, housings of the liquid crystal display panel 22 and laptop personal computer main body 21 can be molded using the broad band light absorbing photocatalyst composition (resin composition) of the present invention.

Figure 9A:
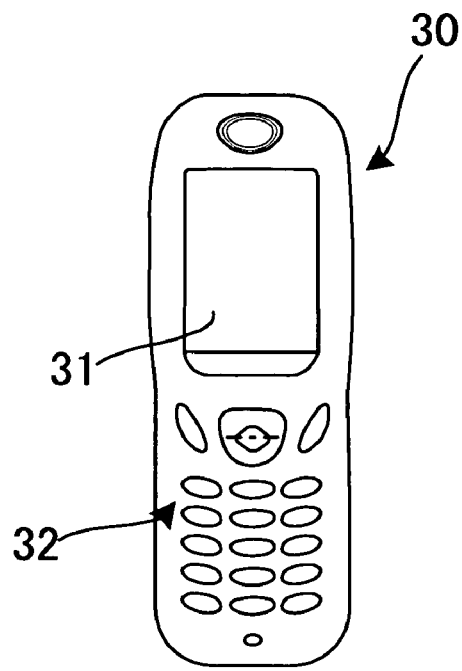
FIGS. 9A, 9B, and 9C are schematic diagrams illustrating a specific example of the cases where the molded article of the present invention is a mobile phone
Figure 9B:
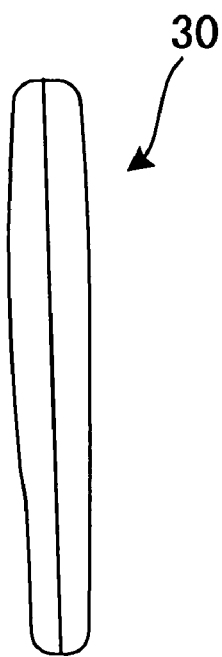
Figure 9C:
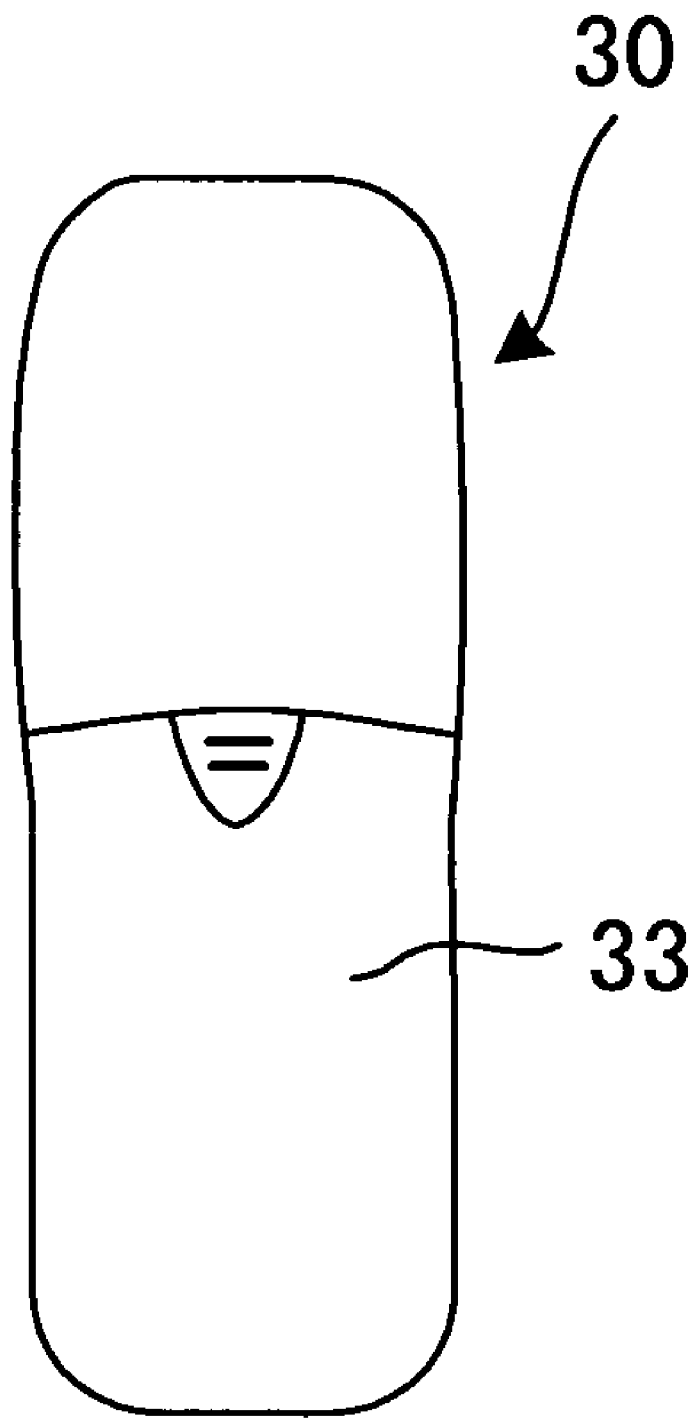

FIGS. 9A, 9B, and 9C are schematic diagrams illustrating an example of the cases where the molded article of the present invention is a mobile phone. FIGS. 9A, 9B, and 9C are a front view, a side view, and a back view, respectively.

A mobile phone 30 has a display 31, function keys 32 serving as input means, and a back lid 33 behind which a battery is housed. The mobile phone shown in FIG. 9A is not clamshell-style, but may be a flip mobile phone which can be folded in half by the action of a hinge.

The mobile phone 30 has surfaces which are spray coated with the coating solution containing the broad band light absorbing photocatalyst of the present invention and the broad band light absorbing photocatalyst is exposed on the surfaces. Thus, mobile phone 30 absorbs both of visible light and ultraviolet light and can exhibit high photocatalytic activity. In addition, photocatalytic activity under any of visible light and ultraviolet light does not saturate and exhibits satisfactory antifouling properties against hand discharge, cigarette tar, etc. and also exhibits antibacterial properties against microorganisms such as fungus and bacteria, and the like.

The screen of the display 31 can be provided with a filter having a surface on which the broad band light absorbing photocatalyst of the present invention is coated. Further, housings of the mobile phone 30, display 31, function keys 32, and back lid 33 can be molded using the broad band light absorbing photocatalyst composition (resin composition) of the present invention.

The present invention will be illustrated in further detail with reference to several examples below, which are not intended to limit the scope of the present invention.

EXAMPLE 1

—Production of Broad Band Light Absorbing Photocatalyst—

Chromium (III) nitrate 9-hydrate (manufactured by Wako Pure Chemical Industries, Ltd.) containing chromium as the visible light absorbing metal atom was dissolved in pure water to prepare an aqueous solution of chromium nitrate with a chromium concentration of $1 \times 10^{-4}$ M. Then, 1.5 g of titanium-calcium hydroxyapatite (TiHAP; manufactured by Taihei Chemical Industrial Co., Ltd., PCAP-100) as an apatite containing titanium which is the metal atom having the photocatalytic activity was weighed in a 300 ml beaker and the aqueous solution of chromium nitrate was added therein to prepare a mixture. After stirring of this mixture for 5 minutes with a magnetic stirrer, the mixture was suction filtered through Whatman No. 5 filter paper using an aspirator. Then, after the filter cake was washed with 4 L to 5 L of pure water, it was dried for two hours in an oven at 100° C. to obtain TiHAP powder doped with chromium. Next, 12-tungstophosphoric acid n-hydrate (manufactured by Kanto Kagaku Co., Ltd.) containing tungsten (W) as the ultraviolet light absorbing metal atom was dissolved in pure water to prepare an aqueous solution of tungsten salt with a tungsten concentration of $1 \times 10^{-2}$ M. Then, 1.5 g of TiHAP obtained above was weighed in a 300 ml beaker and the aqueous solution of tungsten salt was added therein to prepare a mixture. This mixture was stirred for 5 minutes with a magnetic stirrer. This is the doping step.

Thereafter, the mixture was suction filtered through Whatman No. 5 filter paper using an aspirator and the filter cake was washed with 4 L to 5 L of pure water. This is the washing step. Then, the filter cake was dried for two hours in an oven at 100° C. This is the drying step. Thereafter, sintering (under an air atmosphere) was carried out at 650° C. for 1 hour in a muffle furnace (manufactured by Denken Co., Ltd). This is the sintering step. In this way, the broad band light absorbing photocatalyst (powder form) of Example 1 comprising TiHAP powder (apatite containing a metal atom (titanium) having photocatalytic activity) which was doped with chromium as the visible light absorbing metal atom and tungsten as the ultraviolet light absorbing metal atom, was produced.

EXAMPLE 2

The broad band light absorbing photocatalyst (powder form) of Example 2 comprising TiHAP powder (apatite containing a metal atom (titanium) having photocatalytic activity) which was doped with chromium as the visible light absorbing metal atom and vanadium as the ultraviolet light absorbing metal atom, was produced in the same way as in Example 1, except that, in Example 1, 12-tungstophosphoric acid n-hydrate containing tungsten (W) (manufactured by Kanto Kagaku Co., Ltd.) as the ultraviolet light absorbing metal atom was changed to ammonium vanadate containing vanadium (manufactured by Kanto Kagaku Co., Ltd.).

COMPARATIVE EXAMPLE 1

—Production of Photocatalyst—

The photocatalyst of Comparative Example 1 comprising TiHAP powder which was doped with chromium alone as the visible light absorbing metal atom, was produced in the same way as in Example 1, except that, in Example 1, doping with tungsten (W) as the ultraviolet light absorbing metal atom was not carried out.

<Photocatalytic Activity Evaluation 1>

The broad band light absorbing photocatalyst powder prepared in Example 1 and the photocatalyst powder prepared in Comparative Example 1, respectively, were weighed in a petri dish so that the surface area thereof was 85.5 m$^2$, placed in a 500 ml of closed vessel and inside of the vessel was substituted with synthetic air (oxygen 30% by volume-nitrogen 70% by volume). Then, 12 ml of gas with a concentration of acetaldehyde gas of about 14,000 ppm (the rest of it was synthetic air) was injected inside the vessel with syringe and left in a dark place until the acetaldehyde gas reached adsorption equilibrium with the photocatalyst powder (about 2 hours). Thereafter, the vessel was left in a dark place for an hour, and then exposed to visible light for 3 hours, subsequently, to ultraviolet light for 2 hours. The gas inside the vessel was removed with a syringe after 1-hour, 2-hour, and 3-hour exposure to visible light, and after 1-hour and 2-hour exposure to ultraviolet light, respectively, and the concentration of acetaldehyde gas and the concentration of carbon dioxide gas which was generated by the decomposition of acetaldehyde gas were measured using a gas chromatography (GC-390B, manufactured by GL Sciences, Inc.). The results are shown in FIG. 1.

Note that irradiation with visible light was carried out using light (39500 lux) of which ultraviolet light was cut off by combining a xenon light source "LA-251Xe" (manufactured by Hayashi Watch-works Co., Ltd.) and a L42 filter. Black light (1 mW/cm$^2$) was used for the irradiation with ultraviolet light.

<Photocatalytic Activity Evaluation 2>

Figure 2:
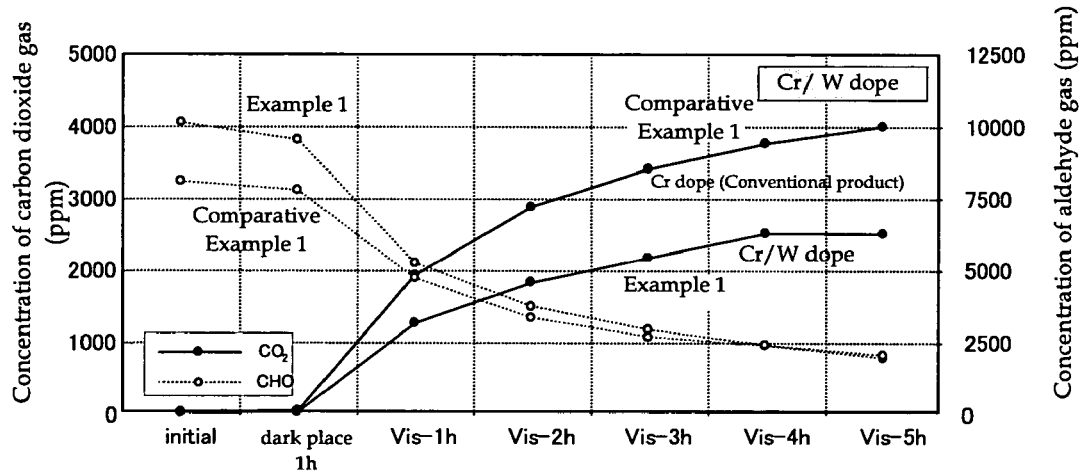
FIG. 2 is a graph showing the results of the photocatalytic activity evaluation of the Example 1 and Comparative Example 1 under visible light irradiation.

Photocatalytic activity was evaluated (<Photocatalytic activity evaluation 2>) in the same way as in <Photocatalytic activity evaluation 1>, except that, in <Photocatalytic activity evaluation 1>, the vessel was left in a dark place for an hour, and then exposed to visible light for 5 hours. The gas inside the vessel was removed with a syringe after 1-hour, 2-hour, 3-hour, 4-hour, 5-hour exposure to visible light, respectively, and the concentration of acetaldehyde gas and the concentration of carbon dioxide gas which was generated by the decomposition of acetaldehyde gas were measured using a gas chromatography (GC-390B, manufactured by GL Sciences, Inc.). The results are shown in FIG. 2.

<Photocatalytic Activity Evaluation 3>

Figure 3:
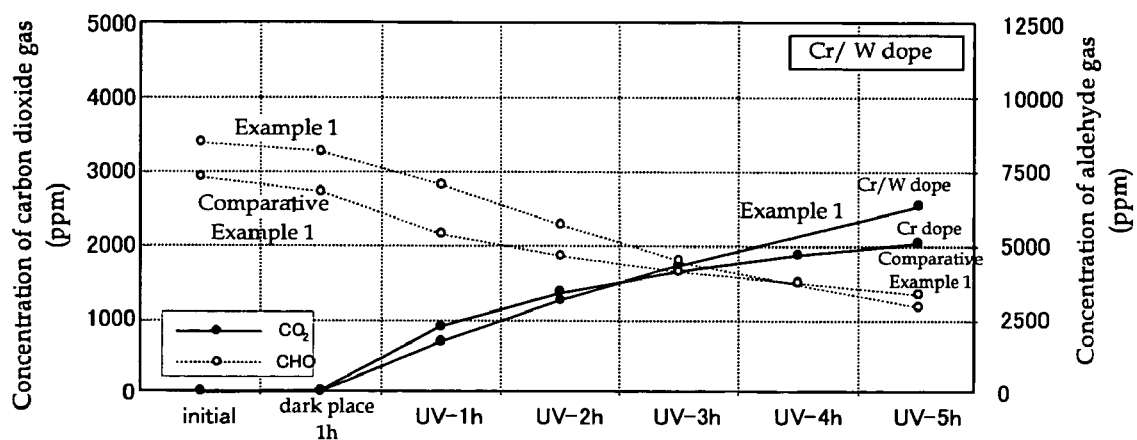
FIG. 3 is a graph showing the results of the photocatalytic activity evaluation of the Example 1 and Comparative Example 1 under ultraviolet light irradiation.

Photocatalytic activity was evaluated (<Photocatalytic activity evaluation 3>) in the same way as in <Photocatalytic activity evaluation 1>, except that, in <Photocatalytic activity evaluation 1>, the vessel was left in a dark place for an hour, and then exposed to ultraviolet light for 5 hours. The gas inside the vessel was removed with a syringe after 1-hour, 2-hour, 3-hour, 4-hour, 5-hour exposure to ultraviolet light, respectively, and the concentration of acetaldehyde gas and the concentration of carbon dioxide gas which was generated by the decomposition of acetaldehyde gas were measured using a gas chromatography (GC-390B, manufactured by GL Sciences, Inc.). The results are shown in FIG. 3.

<Photocatalytic Activity Evaluation 4>

Photocatalytic activity was evaluated (<Photocatalytic activity evaluation 4>) in the same way as in <Photocatalytic activity evaluation 1>, except that, in <Photocatalytic activity evaluation 1>, the vessel was left in a dark place for an hour, and then exposed to sunlight for 5 hours. The gas inside the vessel was removed with a syringe after 1-hour, 2-hour, 3-hour, 4-hour, 5-hour exposure to sunlight, respectively, and the concentration of acetaldehyde gas and the concentration of carbon dioxide gas which was generated by the decomposition of acetaldehyde gas were measured using a gas chromatography (GC-390B, manufactured by GL Sciences, Inc.).

Note that the exposure conditions were as follows:
Weather: fine, Temperature: 25° C., Humidity: 50% RH, Illuminance: 2 mW/cm$^2$.

<Photocatalytic Activity Evaluation 5>

The photocatalyst powders prepared in Example 2 and in Comparative Example 1, respectively, were weighed in a petri dish so that the surface area thereof was 85.5 m$^2$, placed in a 500 ml of closed vessel and inside of the vessel was substituted with synthetic air (oxygen 30% by volume-nitrogen 70% by volume). Then, 12 ml of gas with a concentration of acetaldehyde gas of about 14,000 ppm (the rest of it was synthetic air) was injected inside the vessel with syringe and left in a dark place until the acetaldehyde gas reached adsorption equilibrium with the photocatalyst powder (about 2 hours).

Figure 4:
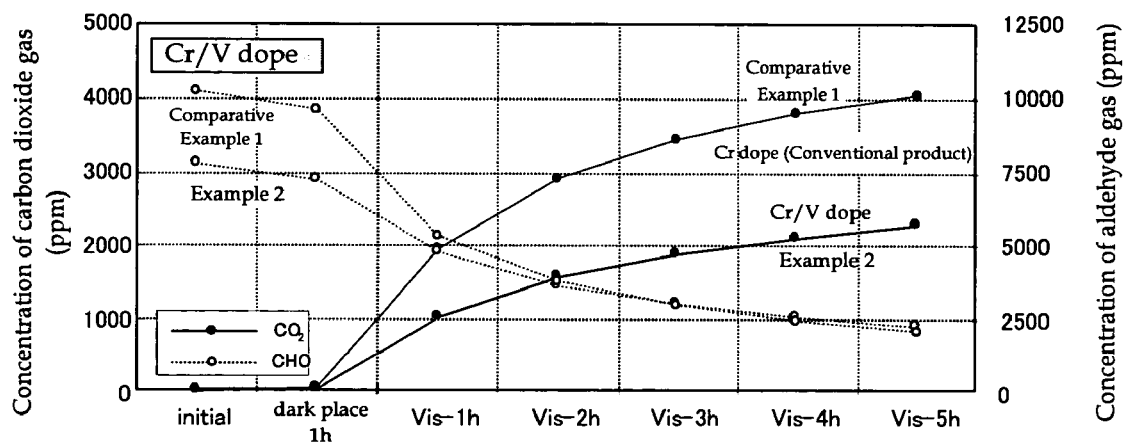
FIG. 4 is a graph showing the results of the photocatalytic activity evaluation of the Example 2 and Comparative Example 1 under visible light irradiation.
Figure 6:
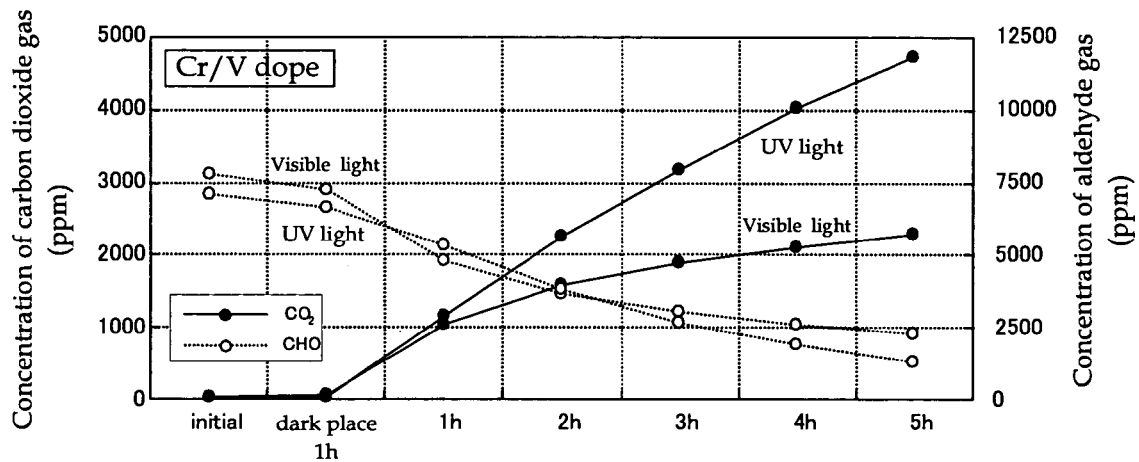
FIG. 6 is a graph showing the results of the photocatalytic activity evaluation of the photocatalyst powder prepared in Example 2 under visible light irradiation or ultraviolet light irradiation.

Thereafter, the vessel was left in a dark place for an hour, and then exposed to visible light for 5 hours. The gas inside the vessel was removed with a syringe after 1-hour, 2-hour, 3-hour, 4-hour, 5-hour exposure to visible light, respectively, and the concentration of acetaldehyde gas and the concentration of carbon dioxide gas which was generated by the decomposition of acetaldehyde gas were measured using a gas chromatography (GC-390B, manufactured by GL Sciences, Inc.). The results are shown in FIG. 4 and the results of the photocatalyst powder prepared in Example 2 are shown in FIG. 6.

<Photocatalytic Activity Evaluation 6>

Figure 5:
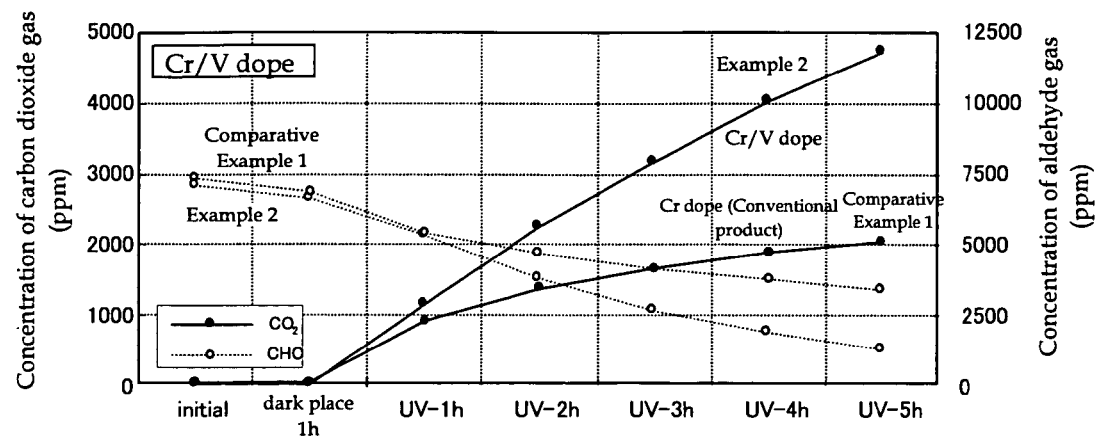
FIG. 5 is a graph showing the results of the photocatalytic activity evaluation of the Example 2 and Comparative Example 1 under ultraviolet light irradiation.

Photocatalytic activity was evaluated (<Photocatalytic activity evaluation 6>) in the same way as in <Photocatalytic activity evaluation 5>, except that, in <Photocatalytic activity evaluation 5>, the vessel was left in a dark place for an hour, and then exposed to ultraviolet light for 5 hours. The gas inside the vessel was removed with a syringe after 1-hour, 2-hour, 3-hour, 4-hour, 5-hour exposure to ultraviolet light, respectively, and the concentration of acetaldehyde gas and the concentration of carbon dioxide gas which was generated by the decomposition of acetaldehyde gas were measured using a gas chromatography (GC-390B, manufactured by GL Sciences, Inc.). The results are shown in FIG. 5 and the results of the photocatalyst powder prepared in Example 2 are shown in FIG. 6.

<Photocatalytic Activity Evaluation 7>

Photocatalytic activity was evaluated (<Photocatalytic activity evaluation 7>) in the same way as in <Photocatalytic activity evaluation 5>, except that, in <Photocatalytic activity evaluation 5>, the vessel was left in a dark place for an hour, and then exposed to sunlight for 5 hours. The gas inside the vessel was removed with a syringe after 1-hour, 2-hour, 3-hour, 4-hour, 5-hour exposure to sunlight, respectively, and the concentration of acetaldehyde gas and the concentration of carbon dioxide gas which was generated by the decomposition of acetaldehyde gas were measured using a gas chromatography (GC-390B, manufactured by GL Sciences, Inc.).

Note that the exposure conditions were as follows:
Weather: fine, Temperature: 25° C., Humidity: 50% RH, Illuminance: 2 mW/cm$^2$.

Note that, in FIGS. 1 to 6, "dark place 1 h" means that the vessel was left in a dark place for 1 hour, "Vis" means that the vessel was exposed to visible light, "Vis-1h" means that the vessel was exposed to visible light for 1 hour, "UV" means that the vessel was exposed to ultraviolet light, "UV-1h" means that the vessel was exposed to ultraviolet light for 1 hour. In each of FIGS. 1 to 6, the right vertical axis represents the concentration (ppm) of "acetaldehyde gas" as the object to be decomposed and the left vertical axis represents the concentration (ppm) of "carbon dioxide gas" (carbon dioxide) which is decomposition product of the acetaldehyde gas.

From the results of FIGS. 1 to 3, it was found that the broad band light absorbing photocatalyst produced in Example 1. i.e., a photocatalyst comprising titanium-calcium hydroxyapatite doped with chromium and tungsten, compared to the photocatalyst of Comparative Example 1 which was titanium-calcium hydroxyapatite doped with chromium alone, had decreased response to visible light to a certain but harmless degree, but had increased photocatalytic activity under ultraviolet light, and found that when the broad band light absorbing photocatalyst of Example 1 was exposed to ultraviolet light, photocatalytic activity thereof did not saturate and was kept over a long period.

Further, from the results of FIGS. 4 to 6, it was found that the broad band light absorbing photocatalyst of Example 2. i.e., a photocatalyst which was titanium-calcium hydroxyapatite doped with chromium and vanadium, compared to the photocatalyst of Comparative Example 1 which was titanium-calcium hydroxyapatite doped with chromium alone, had decreased response to visible light to a certain but harmless degree, but photocatalytic activity under ultraviolet light had remarkably increased, about twice as much as that of Comparative Example 1, and found that when the broad band light absorbing photocatalyst was exposed to ultraviolet light, photocatalytic activity thereof did not saturate and was kept over a long period.

EXAMPLE 3

—Preparation of Broad Band Light Absorbing Photocatalyst Composition—

95 parts by mass of polypropylene resin and 5 pars by mass of broad band light absorbing photocatalyst of Example 1 (5% by mass to the total mass) were mixed by a common procedure to prepare the broad band light absorbing photocatalyst composition of Example 3.

EXAMPLE 4

—Preparation of Broad Band Light Absorbing Photocatalyst Composition—

90 parts of polypropylene resin and 10 pars of broad band light absorbing photocatalyst composition of Example 2 (10% by mass to the total mass) were mixed by a common procedure to prepare the broad band light absorbing photocatalyst composition of Example 4.

EXAMPLE 5

—Preparation of Broad Band Light Absorbing Photocatalyst Composition—

95 parts by mass of polylactic acid and 5 pars by mass of broad band light absorbing photocatalyst composition of Example 1 (5% by mass to the total mass) were mixed by a common procedure to prepare the broad band light absorbing photocatalyst composition of Example 5.

EXAMPLE 6

—Preparation of Broad Band Light Absorbing Photocatalyst Composition—

90 parts of polylactic acid and 10 pars of broad band light absorbing photocatalyst of Example 2 (10% by mass to the total mass) were mixed by a common procedure to prepare the broad band light absorbing photocatalyst composition of Example 6.

COMPARATIVE EXAMPLE 2

—Preparation of Photocatalytic Composition—

95 parts by mass of polypropylene resin and 5 pars by mass of titanium oxide as a photocatalyst (5% by mass to the total mass) were mixed by a common procedure to prepare the photocatalytic composition of Comparative Example 2.

COMPARATIVE EXAMPLE 3

—Preparation of Photocatalytic Composition—

90 parts by mass of polylactic acid and 10 pars by mass of titanium oxide as a photocatalyst (10% by mass to the total mass) were mixed by a common procedure to prepare the photocatalytic composition of Comparative Example 3.

COMPARATIVE EXAMPLE 4

—Preparation of Photocatalytic Composition—

The photocatalytic composition of Comparative Example 4 was prepared in the same way as in Comparative Example 3, except that, in Comparative Example 3, photocatalyst was not added.

Next, the prepared photocatalytic compositions of Examples 3 to 6 and Comparative Examples 2 to 4, respectively, were melt kneaded at 165° C. in an injection molding press and then injected into a plate mold to shape test pieces (molded articles) with a size of 3 mm×100 mm×100 mm. Thus, test pieces (molded articles) were prepared.

<Photocatalytic Activity Evaluation of Molded Article>

The photocatalytic activity of the test pieces of Examples 3 to 6 and Comparative Examples 2 to 4 was evaluated by a degradation analysis using methylene blue. Specifically, initially, test pieces of Examples 3 to 6 and Comparative Examples 2 to 4 were immersed in an aqueous solution of methylene blue (10 μM) to be dyed. Then, the dyed test pieces were exposed to visible light for 5 hours and subsequently exposed to ultraviolet light for 5 hours. As a result, in the test pieces of Examples 3 to 6 and Comparative Examples 2 and 3, the colored surface thereof was discolored due to the decomposition of the dye, compared to that of Comparative Example 4 into which photocatalyst was not added, indicating that the photocatalytic compositions of Examples 3 to 6 and Comparative Examples 2 and 3 had decomposition action based on the photocatalytic function.

Further, in the cases of Comparative Examples 2 and 3, phenomenon of choking that after ultraviolet light irradiation, titanium oxide particles were exposed on the surface to become discolored whitely. In contrast, in the cases of Examples 3 to 6, alteration, discoloration, deterioration, etc were not observed.

Note that irradiation with visible light was carried using light (39500 lux) of which ultraviolet light was cut off by combining a xenon light source "LA-251Xe" (manufactured by Hayashi Watch-works Co., Ltd.) and a L42 filter. Black light (1 mW/cm$^2$) was used for the ultraviolet light irradiation.

EXAMPLE 7

—Preparation of Coating Solution—

The broad band light absorbing photocatalyst of Example 1 was added in isopropyl alcohol (IPA) to prepare 5% by mass alcohol solution. 0.2 g of the obtained alcohol solution was added to 2 g of a room-temperature setting type inorganic coating agent (obtained by mixing a liquid material (name of commodity: S00) and a liquid material (name of commodity: UTTE01) in the ratio of 10 to 1, both available from Nihon Yamamura Glass Co., Ltd.) as an inorganic coating solution material and mixed. Thus, the coating solution of Preparation Example 1 was prepared.

Next, two desktop personal computers (commercial name: FMV desk power, available from Fujitsu Limited) as shown in FIG. 7 were prepared. The keyboard part, personal computer main body, and display part of one of the desktop personal computers were spray coated with the coating solution of Preparation Example 1 (Sample 1). In contrast, another desktop personal computer was not coated with the coating solution of Preparation Example 1 (Comparative Sample 1).

Next, after input operation of two desktop personal computers in a room for 1 month, those were left for 1 week and then, regarding the two desktop personal computers, the degree to which the keyboard part, personal computer main body, and display part got dirt was examined and compared. Thus, it was found that apparently, Sample 1 had less adhesion of dirt compared to Comparative Sample 1.

EXAMPLE 8

Two laptop personal computers (commercial name: FMV LOOX, available from Fujitsu Limited) as shown in FIG. 8 were prepared. The liquid crystal display panel, laptop personal computer main body, and keyboard part of one of the laptop personal computers were spray coated with the coating solution of Preparation Example 1 (Sample 2). In contrast, another laptop personal computer was not coated with the coating solution of Preparation Example 1 (Comparative Sample 2).

Next, after input operation of two laptop personal computers in a room for 1 month, those were left for 1 week and then, regarding the two laptop personal computers, the degree to which the liquid crystal display panel, laptop personal computer main body, and keyboard part got dirt was examined and compared. Thus, it was found that apparently, Sample 2 had less adhesion of dirt compared to Comparative Sample 2.

EXAMPLE 9

Two mobile phones (commercial name: F208, available from Fujitsu Limited) as shown in FIG. 9A were prepared.

The function keys and display of one of the mobile phones were spray coated with the coating solution of Preparation Example 1 (Sample 3). In contrast, another mobile phone was not coated with the coating solution of Preparation Example 1 (Comparative Sample 3).

Next, after input operation of two mobile phones in a room for 1 month, those were left for 1 week and then, regarding the two mobile phones, the degree to which the function keys and display got dirt was examined and compared. Thus, it was found that apparently, Sample 3 had less adhesion of dirt compared to Comparative Sample 3.

EXAMPLE 10

Two desktop personal computers (commercial name: FMV desk power, available from Fujitsu Ltd.) as shown in FIG. 7 were prepared.

The photocatalytic composition of Example 5 was injection molded using a mold for shaping a keyboard by a common procedure to thereby prepare a keyboard. The obtained keyboard was connected to one desktop personal computer (Sample 4). In contrast, a commercial keyboard was connected to another desktop personal computer (Comparative Sample 4).

Next, after input operation of two desktop personal computers in a room for 1 month, those were left for 1 week and then, regarding the two desktop personal computers, the degree to which the keyboards got dirt was examined and compared. Thus, it was found that apparently, Sample 4 had less adhesion of dirt compared to Comparative Sample 4.

The broad band light absorbing photocatalyst of the present invention can be advantageously used in a variety of fields, for example, in a variety of products for use under fluorescent light in a room, a variety of products for use under sunlight irradiation, a variety of products for use under ultraviolet light irradiation, etc. since the broad band light absorbing photocatalyst absorb a broad band light and can utilize it. Thus, specifically, the broad band light absorbing photocatalyst can be suitably used in office automation (OA) equipments (housing of personal computer, mouse, keyboard), electronic equipments (e.g., telephone equipment, copy machine, facsimile, a variety of printers, digital camera, video, CD equipment, DVD equipment, air conditioner, remote-control unit), electronic products (e.g., dish washer, dish dryer, cloth drier, washing machine, air cleaner, conditioning machine, fan, exhaust fan, cleaner, garbage disposer), handheld terminals (e.g., Personal Digital Assistant (PDA), mobile phone), filters (e.g., for gas: ones used in a air cleaner, air conditioner, etc.; for liquid: ones for waste water of tank forming, etc.; for solid: ones for soil improvement; filter for a camera), wallpapers, food containers (e.g., recycle type, disposal type), medical equipments and sanitary goods (e.g., mask part of oxygen inhalators, cotton gauze, mask, antibacterial glove), textile products such a cloth, artificial teeth, materials for interior and exterior (e.g., ones such as made of resin, made of paper, made of cloth, made of ceramic, and made of metal; ones for a bath, pool, building material, etc., ones for medical facilities, bio-laboratories, clean benches, etc. which are exposed to fluorescent light if those are used by people and which are exposed to ultraviolet light if those are not used by people), vehicles (e.g., interior material, review mirror for vehicles), stationary rings (e.g., ones in a train or bus), handles (e.g., bicycle, tricycle, motorcycle, car), saddles (e.g., bicycle, tricycle, motorcycle), shoes (e.g., ones such as made of cloth, made of resin, made of artificial leather, and made of synthetic resin), bags (e.g., ones such as made of cloth, made of resin, made of artificial leather, and made of synthetic resin), paints (e.g., paint film), treatment materials for sewage water/discharged water (for example, a mixture in which the broad band light absorbing photocatalyst is mixed in a porous silica), sheets (e.g., soil treatment sheet), electrodes of biochips (in combination with organic dyes), mirrors (e.g., mirrors for a bathroom, rest room, dentistry, road, etc.), lenses (e.g., glass lens, optical lens, lens for lighting, lens for semiconductors, lens for copy machines, review camera lens for vehicles), prisms, glasses (e.g., window glass of buildings or lookout towers; window glass of vehicles such as automobiles, railway cars, airplanes, ships, submarines, snow cars, gondolas of ropeways, gondolas of amusement parks, and spaceships; windshield of vehicles such as automobiles, motorcycles, railway cars, airplanes, ships, submarines, snow cars, snowmobiles, gondolas of ropeways, gondolas of amusement parks, and spaceships; glass of display cases for frozen foods, glass of display cases for heat-retention foods such as steamed bread), goggles (e.g., goggle for protection, goggle for sports), shields (e.g., shield of protection masks, shield of masks for sports, helmet shield), covers (cover of measurement equipments and cover of review camera lenses for vehicles), lenses (e.g., focusing lens of laser dentistry therapy equipments, etc.), covers (e.g., cover of sensors for laser light detection such as a sensor for measuring the distance between two cars, cover of infrared ray sensors, film, sheet, seal, escutcheon), and the like.

The process for producing a broad band light absorbing photocatalyst of the present invention can be suitably used for producing the broad band light absorbing photocatalyst of the present invention.

The broad band light absorbing photocatalyst composition of the present invention is easily molded, suitable for mass production, and can be suitably used for similar applications as the above-mentioned specific applications of the broad band light absorbing photocatalyst.

The molded article of the present invention can be suitably used for similar applications as the above-mentioned specific applications of the broad band light absorbing photocatalyst.

The present invention can solve the conventional problems and provide a broad band light absorbing photocatalyst which has a high absorptivity not only for visible light but also, in particular, for ultraviolet light, exhibits photocatalytic activity in response to a broad band light over a long period, has a high adsorptivity for objects to be decomposed, can exhibit oxidative decomposition effect, antibacterial effect, antifouling effect, etc. and is high-performance; a process for producing thereof efficiently; a broad band light absorbing photocatalyst composition which comprises the broad band light absorbing photocatalyst; and a molded article which comprises the broad band light absorbing photocatalyst.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A light absorbing photocatalyst comprising:
    an apatite comprising titanium as a metal atom having photocatalytic activity;
    a visible light absorbing metal atom; and
    an ultraviolet light absorbing metal atom, wherein the ultraviolet light absorbing metal atom is vanadium (V), wherein the content of the visible light absorbing metal atom to a total amount of metal atoms is 0.001% by mol to 1% by mol.

2. A light absorbing photocatalyst according to claim 1, wherein the apatite having photocatalytic activity comprises a metal atom and at least a part of the metal atom is substituted with an ultraviolet light absorbing metal atom and a visible light absorbing metal atom.

3. A. light absorbing photocatalyst according to claim 1, wherein the content of the ultraviolet light absorbing metal atom to a total amount of metal atoms is 0.001% by mol to 0.1% by mol.

4. A light absorbing photocatalyst according to claim 1, wherein the visible light absorbing metal atom is at least one selected from chromium (Cr) and nickel (Ni).

5. A light absorbing photocatalyst according to claim 1, wherein the apatite having photocatalytic activity comprises a metal atom having photocatalytic activity.

6. A light absorbing photocatalyst according to claim 5, wherein the content of the metal atom required for the apatite to possess photocatalytic activity to a total amount of metal atoms is 5% by mol to 15% by mol.

7. A light absorbing photocatalyst according to claim 1, wherein the apatite is represented by the following General Formula (1):

$$A_m(BO_n)_z X_s \qquad \text{General Formula (1)}$$

where "A" represents a metal atom, "B" represents one of a phosphorus atom (P) and a sulfur atom (S), "O" represents an oxygen atom, "X" represents any one of a hydroxyl group, $CO_3$, and a halogen atom, "m" represents an integer from 8 to 10, "n" represents an integer from 3 to 4, "z" represents an integer from 5 to 7, and "s" represents an integer from 1 to 4.

8. A light absorbing photocatalyst according to claim 7, wherein "A" is calcium (Ca), "B" is the phosphorus atom (P) and "X" is the hydroxyl group, and the apatite having photocatalytic activity is calcium hydroxyapatite $Ca_{10}(PO_4)_6(OH)_2$.

9. A light absorbing photocatalyst according to claim 1, wherein the light absorbing photocatalyst is in at least any one form of powder form, granular form, tablet form, rod form, plate form, block form, sheet form, and film form.

10. A light absorbing photocatalyst according to claim 1, wherein the ratio of the photocatalytic activity at the time after irradiation with ultraviolet light (UV light) for 5 hours in a row A5 to the photocatalytic activity at the time after irradiation with ultraviolet light (UV light) for 2 hours in a row A2, that is, A5/A2, determined under the same condition is 1.3 or more.

11. A light absorbing photocatalyst according to claim 1, wherein the ratio of the reduced concentration (ppm) of the acetaldehyde gas at the time after irradiation with ultraviolet light for 5 hours in a row C5 to the reduced concentration (ppm) of the acetaldehyde gas after irradiation with ultraviolet light for 2 hours in a row C2, that is, C5/C2, determined under the following condition is 1.3 or more:

the light absorbing photocatalyst is placed in a 500 ml of closed vessel in such amount that the surface area thereof is 85.5 m², inside of the vessel is substituted with a gas containing 30% by volume of oxygen and 70% by volume of nitrogen, 12 ml of the gas containing 14,000 ppm of acetaldehyde gas is then injected inside the vessel with a syringe, the vessel is left in a dark place until the acetaldehyde gas reaches adsorption equilibrium with the light absorbing photocatalyst, after the equilibrium, the vessel is further left in a dark place for 1 hour and then continuously irradiated with ultraviolet light with wavelengths of equal to or less than 380 nm.

* * * * *

UNITED STATES PATENT AND TRADEMARK OFFICE
CERTIFICATE OF CORRECTION

| | | |
|---|---|---|
| PATENT NO. | : 7,579,296 B2 | Page 1 of 1 |
| APPLICATION NO. | : 11/168459 | |
| DATED | : August 25, 2009 | |
| INVENTOR(S) | : Yasuo Naganuma | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 28 days.

Signed and Sealed this
Fourteenth Day of June, 2011

David J. Kappos
*Director of the United States Patent and Trademark Office*